(12) United States Patent
Vijayan

(10) Patent No.: US 9,633,022 B2
(45) Date of Patent: Apr. 25, 2017

(54) BACKUP AND RESTORATION FOR A DEDUPLICATED FILE SYSTEM

(71) Applicant: CommVault Systems, Inc., Oceanport, NJ (US)

(72) Inventor: Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 473 days.

(21) Appl. No.: 13/791,106

(22) Filed: Mar. 8, 2013

(65) Prior Publication Data

US 2014/0188805 A1    Jul. 3, 2014

Related U.S. Application Data

(60) Provisional application No. 61/746,744, filed on Dec. 28, 2012.

(51) Int. Cl.
| | |
|---|---|
| *G06F 7/00* | (2006.01) |
| *G06F 17/30* | (2006.01) |
| *G06F 11/14* | (2006.01) |

(52) U.S. Cl.
CPC .... *G06F 17/30073* (2013.01); *G06F 11/1453* (2013.01); *G06F 17/30156* (2013.01); *G06F 11/1469* (2013.01)

(58) Field of Classification Search
None
See application file for complete search history.

(56) References Cited

U.S. PATENT DOCUMENTS

| | | | |
|---|---|---|---|
| 4,686,620 | A | 8/1987 | Ng |
| 4,713,755 | A | 12/1987 | Worley, Jr. et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

Abdo Sharif, "Cache Memory," Sep. 2005, http://searchstorage.techtarget.com/definition/cache-memory, pp. 1-26.

(Continued)

*Primary Examiner* — Mahesh Dwivedi
*Assistant Examiner* — Hasanul Mobin
(74) *Attorney, Agent, or Firm* — Perkins Coie LLP

(57) ABSTRACT

The disclosed techniques that can use deduplication information on a source computer platform to improve the process of performing data backups or restoration from/to the computer platform. In one example aspect, a data backup operation can re-use some of the work already done by a source computer's deduplication system. For example, a storage operation could read a deduplication database on the source computer platform to determine the duplicativeness of a given data chunk being transferred to a backup storage system, without having to perform computations such as data chunk hashing and comparison with previously generated hashes. The technique may additionally or alternatively reuse hashes generated by the source computer during deduplication of the data file on the source computer's file system during deduplication at the external backup storage system.

13 Claims, 16 Drawing Sheets

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,604,862 A | 2/1997 | Midgely et al. |
| 5,606,686 A | 2/1997 | Tarui et al. |
| 5,619,644 A | 4/1997 | Crockett et al. |
| 5,628,004 A | 5/1997 | Gormley et al. |
| 5,634,052 A | 5/1997 | Morris |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,794,229 A | 8/1998 | French et al. |
| 5,806,057 A | 9/1998 | Gormley et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,822,780 A | 10/1998 | Schutzman |
| 5,862,325 A | 1/1999 | Reed et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,073,133 A | 6/2000 | Chrabaszcz |
| 6,076,148 A | 6/2000 | Kedem |
| 6,094,416 A | 7/2000 | Ying |
| 6,125,369 A | 9/2000 | Wu et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo et al. |
| 6,609,183 B2 | 8/2003 | Ohran |
| 6,609,187 B1 | 8/2003 | Merrell et al. |
| 6,658,526 B2 | 12/2003 | Nguyen et al. |
| 6,675,177 B1 | 1/2004 | Webb |
| 6,704,730 B2 | 3/2004 | Moulton et al. |
| 6,745,304 B2 | 6/2004 | Playe |
| 6,757,699 B2 | 6/2004 | Lowry |
| 6,757,794 B2 | 6/2004 | Cabrera et al. |
| 6,795,903 B2 | 9/2004 | Schultz et al. |
| 6,810,398 B2 | 10/2004 | Moulton |
| 6,862,674 B2 | 3/2005 | Dice et al. |
| 6,865,655 B1 | 3/2005 | Andersen |
| 6,868,417 B2 | 3/2005 | Kazar et al. |
| 6,901,493 B1 | 5/2005 | Maffezzoni |
| 6,912,645 B2 | 6/2005 | Dorward et al. |
| 6,928,459 B1 | 8/2005 | Sawdon et al. |
| 6,952,758 B2 | 10/2005 | Chron et al. |
| 6,959,368 B1 | 10/2005 | St. Pierre et al. |
| 6,973,553 B1 | 12/2005 | Archibald, Jr. et al. |
| 6,976,039 B2 | 12/2005 | Chefalas et al. |
| 6,993,162 B2 | 1/2006 | Stephany et al. |
| 7,017,113 B2 | 3/2006 | Bourbakis et al. |
| 7,035,880 B1 | 4/2006 | Crescenti et al. |
| 7,035,943 B2 | 4/2006 | Yamane et al. |
| 7,085,904 B2 | 8/2006 | Mizuno et al. |
| 7,089,383 B2 | 8/2006 | Ji et al. |
| 7,089,395 B2 | 8/2006 | Jacobson et al. |
| 7,103,740 B1 | 9/2006 | Colgrove et al. |
| 7,107,418 B2 | 9/2006 | Ohran |
| 7,111,173 B1 | 9/2006 | Scheidt |
| 7,117,246 B2 | 10/2006 | Christenson et al. |
| 7,139,808 B2 | 11/2006 | Anderson et al. |
| 7,143,091 B2 | 11/2006 | Charnock et al. |
| 7,191,290 B1 | 3/2007 | Ackaouy et al. |
| 7,200,604 B2 | 4/2007 | Forman et al. |
| 7,200,621 B2 | 4/2007 | Beck et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,310,655 B2 | 12/2007 | Dussud |
| 7,320,059 B1 | 1/2008 | Armangau et al. |
| 7,325,110 B2 | 1/2008 | Kubo et al. |
| 7,330,997 B1 | 2/2008 | Odom |
| 7,343,459 B2 | 3/2008 | Prahlad et al. |
| 7,376,805 B2 | 5/2008 | Stroberger et al. |
| 7,383,304 B2 | 6/2008 | Shimada et al. |
| 7,383,462 B2 | 6/2008 | Osaki et al. |
| 7,395,282 B1 | 7/2008 | Crescenti et al. |
| 7,409,522 B1 | 8/2008 | Fair et al. |
| 7,444,382 B2 | 10/2008 | Malik |
| 7,444,387 B2 | 10/2008 | Douceur et al. |
| 7,478,113 B1 | 1/2009 | De Spiegeleer et al. |
| 7,480,782 B2 | 1/2009 | Garthwaite |
| 7,487,245 B2 | 2/2009 | Douceur et al. |
| 7,490,207 B2 | 2/2009 | Amarendran et al. |
| 7,493,314 B2 | 2/2009 | Huang et al. |
| 7,496,604 B2 | 2/2009 | Sutton, Jr. et al. |
| 7,519,726 B2 | 4/2009 | Palliyil et al. |
| 7,568,080 B2 | 7/2009 | Prahlad et al. |
| 7,603,529 B1 | 10/2009 | MacHardy et al. |
| 7,613,748 B2 | 11/2009 | Brockway et al. |
| 7,617,297 B2 | 11/2009 | Bruce et al. |

(56) References Cited

U.S. PATENT DOCUMENTS

| | | | |
|---|---|---|---|
| 7,631,194 B2 | 12/2009 | Wahlert et al. |
| 7,636,824 B1 | 12/2009 | Tormasov |
| 7,647,462 B2 | 1/2010 | Wolfgang et al. |
| 7,657,550 B2 | 2/2010 | Prahlad et al. |
| 7,661,028 B2 | 2/2010 | Erofeev |
| 7,668,884 B2 | 2/2010 | Prahlad et al. |
| 7,676,590 B2 | 3/2010 | Silverman et al. |
| 7,685,126 B2 | 3/2010 | Patel et al. |
| 7,685,177 B1 | 3/2010 | Hagerstrom et al. |
| 7,685,459 B1 | 3/2010 | De Spiegeleer et al. |
| 7,698,699 B2 | 4/2010 | Rogers et al. |
| 7,721,292 B2 | 5/2010 | Frasier et al. |
| 7,747,579 B2 | 6/2010 | Prahlad et al. |
| 7,778,979 B2 | 8/2010 | Hatonen et al. |
| 7,788,230 B2 | 8/2010 | Dile et al. |
| 7,814,142 B2 | 10/2010 | Mamou et al. |
| 7,818,287 B2 | 10/2010 | Torii et al. |
| 7,818,495 B2 | 10/2010 | Tanaka et al. |
| 7,831,795 B2 | 11/2010 | Prahlad et al. |
| 7,840,537 B2 | 11/2010 | Gokhale et al. |
| 7,853,750 B2 | 12/2010 | Stager |
| 7,856,414 B2 | 12/2010 | Zee |
| 7,865,678 B2 | 1/2011 | Arakawa et al. |
| 7,870,105 B2 | 1/2011 | Arakawa et al. |
| 7,870,486 B2 | 1/2011 | Wang et al. |
| 7,873,599 B2 | 1/2011 | Ishii et al. |
| 7,873,806 B2 | 1/2011 | Prahlad et al. |
| 7,882,077 B2 | 2/2011 | Gokhale et al. |
| 7,921,077 B2 | 4/2011 | Ting et al. |
| 7,953,706 B2 | 5/2011 | Prahlad et al. |
| 7,962,452 B2 | 6/2011 | Anglin |
| 8,037,028 B2 | 10/2011 | Prahlad et al. |
| 8,041,907 B1 | 10/2011 | Wu et al. |
| 8,054,765 B2 | 11/2011 | Passey et al. |
| 8,055,618 B2 | 11/2011 | Anglin |
| 8,055,627 B2 | 11/2011 | Prahlad et al. |
| 8,055,745 B2 | 11/2011 | Atluri |
| 8,086,799 B2 | 12/2011 | Mondal et al. |
| 8,095,756 B1* | 1/2012 | Somavarapu ....... G06F 11/1453 711/162 |
| 8,108,429 B2 | 1/2012 | Sim-Tang et al. |
| 8,112,357 B2 | 2/2012 | Mueller et al. |
| 8,131,687 B2 | 3/2012 | Bates et al. |
| 8,140,786 B2 | 3/2012 | Bunte et al. |
| 8,156,092 B2 | 4/2012 | Hewett et al. |
| 8,156,279 B2 | 4/2012 | Tanaka et al. |
| 8,161,003 B2 | 4/2012 | Kavuri |
| 8,165,221 B2 | 4/2012 | Zheng et al. |
| 8,166,263 B2 | 4/2012 | Prahlad et al. |
| 8,170,994 B2 | 5/2012 | Tsaur et al. |
| 8,190,823 B2 | 5/2012 | Waltermann et al. |
| 8,190,835 B1 | 5/2012 | Yueh |
| 8,219,524 B2 | 7/2012 | Gokhale |
| 8,234,444 B2 | 7/2012 | Bates et al. |
| 8,271,992 B2 | 9/2012 | Chatley et al. |
| 8,285,683 B2 | 10/2012 | Prahlad et al. |
| 8,392,677 B2 | 3/2013 | Bunte et al. |
| 8,412,677 B2 | 4/2013 | Klose |
| 2002/0055972 A1 | 5/2002 | Weinman |
| 2002/0099806 A1 | 7/2002 | Balsamo et al. |
| 2002/0107877 A1 | 8/2002 | Whiting et al. |
| 2002/0169934 A1 | 11/2002 | Krapp et al. |
| 2003/0004922 A1 | 1/2003 | Schmidt et al. |
| 2003/0074600 A1* | 4/2003 | Tamatsu ............ G06F 11/1458 714/5.11 |
| 2003/0097359 A1 | 5/2003 | Ruediger |
| 2003/0110190 A1 | 6/2003 | Achiwa et al. |
| 2003/0167318 A1 | 9/2003 | Robbin et al. |
| 2003/0172368 A1 | 9/2003 | Alumbaugh et al. |
| 2003/0177149 A1 | 9/2003 | Coombs |
| 2003/0236763 A1 | 12/2003 | Kilduff |
| 2004/0093259 A1 | 5/2004 | Pych |
| 2004/0148306 A1 | 7/2004 | Moulton et al. |
| 2004/0230817 A1 | 11/2004 | Ma |
| 2005/0033756 A1 | 2/2005 | Kottomtharayil et al. |
| 2005/0055359 A1 | 3/2005 | Kawai et al. |
| 2005/0066190 A1 | 3/2005 | Martin |
| 2005/0149589 A1 | 7/2005 | Bacon et al. |
| 2005/0177603 A1 | 8/2005 | Shavit |
| 2005/0203864 A1 | 9/2005 | Schmidt et al. |
| 2005/0210460 A1* | 9/2005 | Rogers ....................... G06F 8/65 717/168 |
| 2005/0234823 A1 | 10/2005 | Schimpf |
| 2005/0262110 A1 | 11/2005 | Gu et al. |
| 2005/0262193 A1 | 11/2005 | Mamou et al. |
| 2005/0286466 A1 | 12/2005 | Tagg et al. |
| 2006/0047894 A1 | 3/2006 | Okumura |
| 2006/0056623 A1 | 3/2006 | Gligor et al. |
| 2006/0089954 A1 | 4/2006 | Anschutz |
| 2006/0095470 A1 | 5/2006 | Cochran et al. |
| 2006/0123313 A1 | 6/2006 | Brown et al. |
| 2006/0129875 A1 | 6/2006 | Barrall |
| 2006/0174112 A1 | 8/2006 | Wray |
| 2006/0224846 A1 | 10/2006 | Amarendran et al. |
| 2006/0230244 A1 | 10/2006 | Amarendran et al. |
| 2007/0022145 A1 | 1/2007 | Kavuri |
| 2007/0136200 A1 | 6/2007 | Frank et al. |
| 2007/0156998 A1 | 7/2007 | Gorobets |
| 2007/0255909 A1 | 11/2007 | Gschwind et al. |
| 2007/0271316 A1 | 11/2007 | Hollebeek |
| 2008/0005141 A1 | 1/2008 | Zheng et al. |
| 2008/0034045 A1 | 2/2008 | Bardsley |
| 2008/0082736 A1 | 4/2008 | Chow et al. |
| 2008/0091881 A1 | 4/2008 | Brittain et al. |
| 2008/0098083 A1 | 4/2008 | Shergill et al. |
| 2008/0125170 A1 | 5/2008 | Masuda |
| 2008/0162467 A1 | 7/2008 | Fuchs |
| 2008/0162518 A1 | 7/2008 | Bollinger et al. |
| 2008/0184001 A1 | 7/2008 | Stager |
| 2008/0243914 A1 | 10/2008 | Prahlad et al. |
| 2008/0244204 A1* | 10/2008 | Cremelie et al. ............ 711/162 |
| 2009/0012984 A1 | 1/2009 | Ravid et al. |
| 2009/0049260 A1 | 2/2009 | Upadhyayula |
| 2009/0063528 A1 | 3/2009 | Yueh |
| 2009/0106369 A1 | 4/2009 | Chen et al. |
| 2009/0106480 A1 | 4/2009 | Chung |
| 2009/0112870 A1 | 4/2009 | Ozzie et al. |
| 2009/0132764 A1 | 5/2009 | Moll et al. |
| 2009/0150498 A1 | 6/2009 | Branda et al. |
| 2009/0204649 A1 | 8/2009 | Wong et al. |
| 2009/0268903 A1 | 10/2009 | Bojinov et al. |
| 2009/0271402 A1 | 10/2009 | Srinivasan et al. |
| 2009/0271454 A1* | 10/2009 | Anglin et al. ................ 707/204 |
| 2009/0319534 A1 | 12/2009 | Gokhale |
| 2010/0036887 A1* | 2/2010 | Anglin et al. ................ 707/200 |
| 2010/0082529 A1 | 4/2010 | Mace et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0161554 A1 | 6/2010 | Datuashvili et al. |
| 2010/0169287 A1 | 7/2010 | Klose |
| 2010/0223441 A1 | 9/2010 | Lillibridge et al. |
| 2010/0250549 A1 | 9/2010 | Muller et al. |
| 2010/0299490 A1 | 11/2010 | Attarde et al. |
| 2011/0035357 A1 | 2/2011 | Ting et al. |
| 2011/0125720 A1 | 5/2011 | Jayaraman |
| 2012/0084524 A1 | 4/2012 | Gokhale et al. |
| 2012/0159098 A1* | 6/2012 | Cheung ............... G06F 12/0261 711/162 |
| 2012/0179656 A1 | 7/2012 | Bunte et al. |
| 2012/0209809 A1 | 8/2012 | Prahlad et al. |
| 2012/0233417 A1* | 9/2012 | Kalach ............... G06F 11/1469 711/162 |
| 2012/0271793 A1 | 10/2012 | Gokhale |
| 2013/0006946 A1 | 1/2013 | Prahlad et al. |
| 2013/0041872 A1* | 2/2013 | Aizman ............ G06F 17/30194 707/690 |
| 2013/0086007 A1* | 4/2013 | Bandopadhyay . G06F 17/30156 707/692 |
| 2013/0179405 A1 | 7/2013 | Bunte et al. |

(56) References Cited

U.S. PATENT DOCUMENTS

FOREIGN PATENT DOCUMENTS

| EP | 0467546 A2 | 1/1992 |
|---|---|---|
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |
| WO | WO-2006052872 A2 | 5/2006 |

OTHER PUBLICATIONS

David Geer, "Reducing the Storage Burden Via Data Deduplication," Dec. 2008, IEEE Computer Society, vol. 41, Issue 12, pp. 15-17.
Jim Handy, "The Cache Memory Book: The Authoritative Reference on Cache Design," Second Edition, 1998, pp. 64-67 and pp. 204-205.
Webopedia, "Cache," Apr. 11, 2001, http://web.archive.org/web/20010411033304/http://www.webopedia.com/TERM/c/cache.html pp. 1-4.
International Preliminary Report on Patentability and Written Opinion for PCT/US2007/086421, Mail Date Jun. 18, 2009, 8 pages.
International Preliminary Report on Patentability and Written Opinion for PCT/US2011/054378, Mail Date Apr. 11, 2013, 5 pages.
International Search Report and Written Opinion for PCT/US07/86421, Mail Date Apr. 18, 2008, 9 pages.
International Search Report for Application No. PCT/US09/58137, Mail Date Dec. 23, 2009, 14 pages.
International Search Report for Application No. PCT/US10/34676, Mail Date Nov. 29, 2010, 9 pages.
International Search Report for Application No. PCT/US11/54378, Mail Date May 2, 2012, 8 pages.
Microsoft, "Computer Dictionary", pp. 142, 150, 192, and 538, Fifth Edition, 2002, 6 pages.
U.S. Appl. No. 13/792,736, filed Mar. 11, 2013, Kottomtharayil et al.
U.S. Appl. No. 13/847,359, filed Mar. 29, 2013, Muller et al.
U.S. Appl. No. 13/855,514, filed Apr. 2, 2013, Klose.
Armstead et al., "Implementation of a Campus-wide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
CommVault Systems, Inc., "Continuous Data Replicator 7.0," Product Data Sheet, 2007, 6 pages.
CommVault Systems, Inc., "Deduplication—How to,"; <http://documentation.commvault.com/commvault/release_8_0_0/books_online_1/english_US;/features/single_instance/single_instance_how_to.htm>, earliest known publication date:; Jan. 26, 2009, 7 pages.
CommVault Systems, Inc., "Deduplication,"; <http://documentation.commvault.com/commvault/release_8_0_0/books_online_1/english_US;/features/single_instance/single_instance.htm>, earliest known publication date: Jan. 26, 2009, 9; pages.
Diligent Technologies "HyperFactor," <http://www.diligent.com/products:protecTIER-1:HyperFactor-1>, Internet accessed on Dec. 5, 2008, 2 pages.
Eitel, "Backup and Storage Management in Distributed Heterogeneous Environments," IEEE, Jun. 12-16, 1994, pp. 124-126.
Enterprise Storage Management, "What Is Hierarchical Storage Management?", Jun. 19, 2005, pp. 1, http://web.archive.org/web/20050619000521/hhttp://www.enterprisestoragemanagement.com/faq/hierarchical-storage-management-shtml.
Enterprise Storage Management, What Is a Incremental Backup?, Oct. 26, 2005, pp. 1-2, http://web.archive.org/web/w0051026010908/http://www.enterprisestoragemanagement.com/faq/incremental-backup.shtml.
Extended European Search Report for EP07865192.4; Date of Mailing May 2, 2013, 7 pages.
Federal Information Processing Standards Publication 180-2, "Secure Hash Standard", Aug. 1, 2002, ; <http://csrc.nist.gov/publications/fips/fips1 80-2/fips 1 80-2withchangenotice. pdf>, 83 pages.
Gait, J., "The Optical File Cabinet: A Random-Access File System for Write-Once Optical Disks," IEEE Computer, vol. 21, No. 6, pp. 11-22 (Jun. 1988).
Geer, D., "Reducing the Storage Burden Via Data Deduplication," IEEE, Computer Journal, vol. 41, Issue 12, Dec. 2008, pp. 15-17.
Jander, M., "Launching Storage-Area Net," Data Communications, US, McGraw Hill, NY, vol. 27, No. 4 (Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Lortu Software Development, "Kondar Technology-Deduplication," <http://www.lortu.com/en/deduplication.asp>, Internet accessed on Dec. 5, 2008, 3 pages.
Menezes et al., "Handbook of Applied Cryptography", CRC Press, 1996, <http://www.cacr.math.uwaterloo.ca/hac/aboutlchap9.pdf>, 64 pages.
Microsoft, "Computer Dictionary", Fifth Edition, 2002, 3 pages.
Overland Storage, "Data Deduplication," <http://www.overlandstorage.com/topics/data_deduplication.html>, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structured File System," Operating Systems Review SIGOPS, vol. 25, No. 5, New York, US, pp. 1-15 (May 1991).
SearchStorage, "File System", Nov. 1998, <http://searchstorage.techtarget.com/definition/file-system>, 10 pages.
Webopedia, "Data Duplication", Aug. 31, 2006, <http://web.archive.org/web/20060913030559/http://www.webopedia.com/TERMID/data_deduplication.html>, 2 pages.
Canada Office Action for Application No. 2706007, mailing date Jul. 30, 2014, 2 pages.
U.S. Appl. No. 15/364,954 for Vijayan et al., filed Nov. 30, 2016.

\* cited by examiner

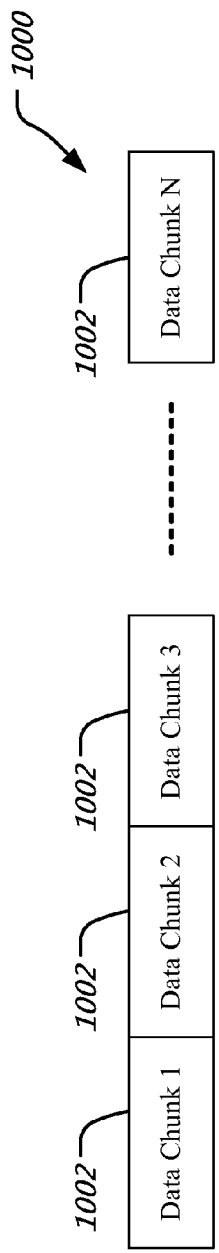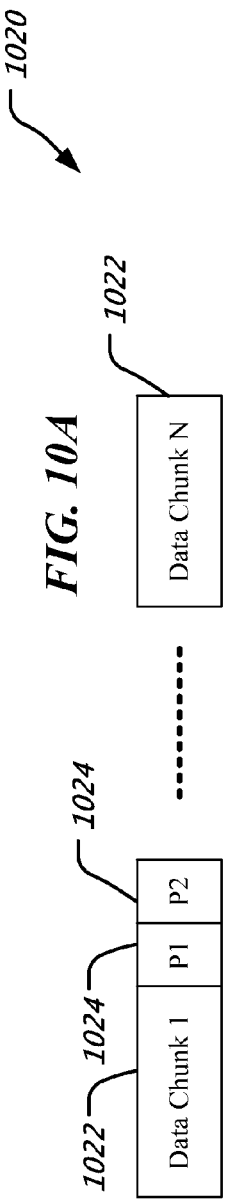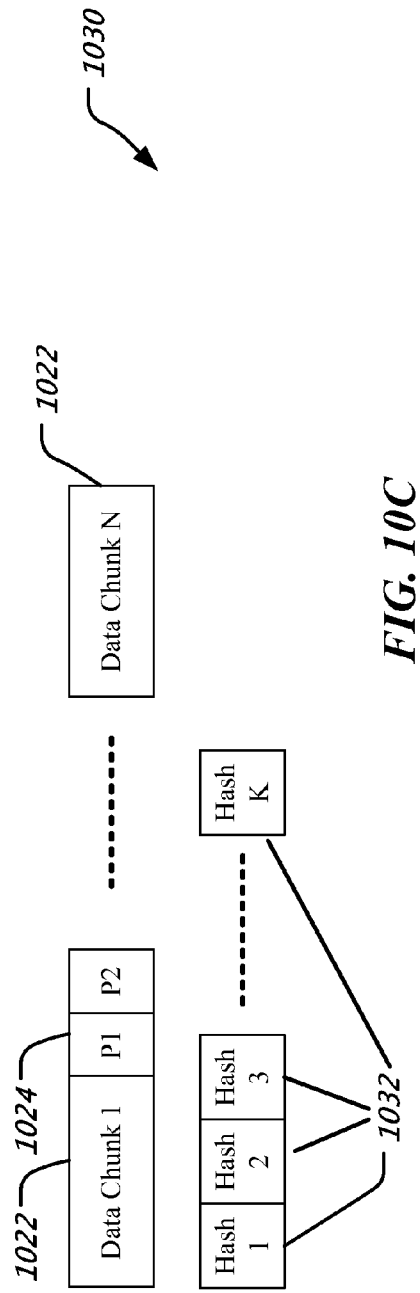

BACKUP AND RESTORATION FOR A DEDUPLICATED FILE SYSTEM

CROSS-REFERENCE TO RELATED APPLICATION(S)

The present application claims priority to and the benefit of U.S. Provisional Application No. 61/746,744, filed Dec. 28, 2012, which is hereby incorporated herein by reference in its entirety.

BACKGROUND

Computer systems contain large amounts of information. This information includes personal information, such as financial information, customer/client/patient contact information, business information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, and then create one or more secondary copies, such as backup files, containing the contents of the file. These secondary copies can then later be used to restore the original data should anything happen to the original data.

Traditional storage system often perform data redundancy reduction before storing backup data. Data redundancy reduction may use valuable system resources.

BRIEF DESCRIPTION OF THE DRAWINGS

FIGS. 10A, 10B and 10C show different data formats used for transferring data for between a source file system and a backup storage system during data backup or restoration operations.

DETAILED DESCRIPTION

Figure 1:
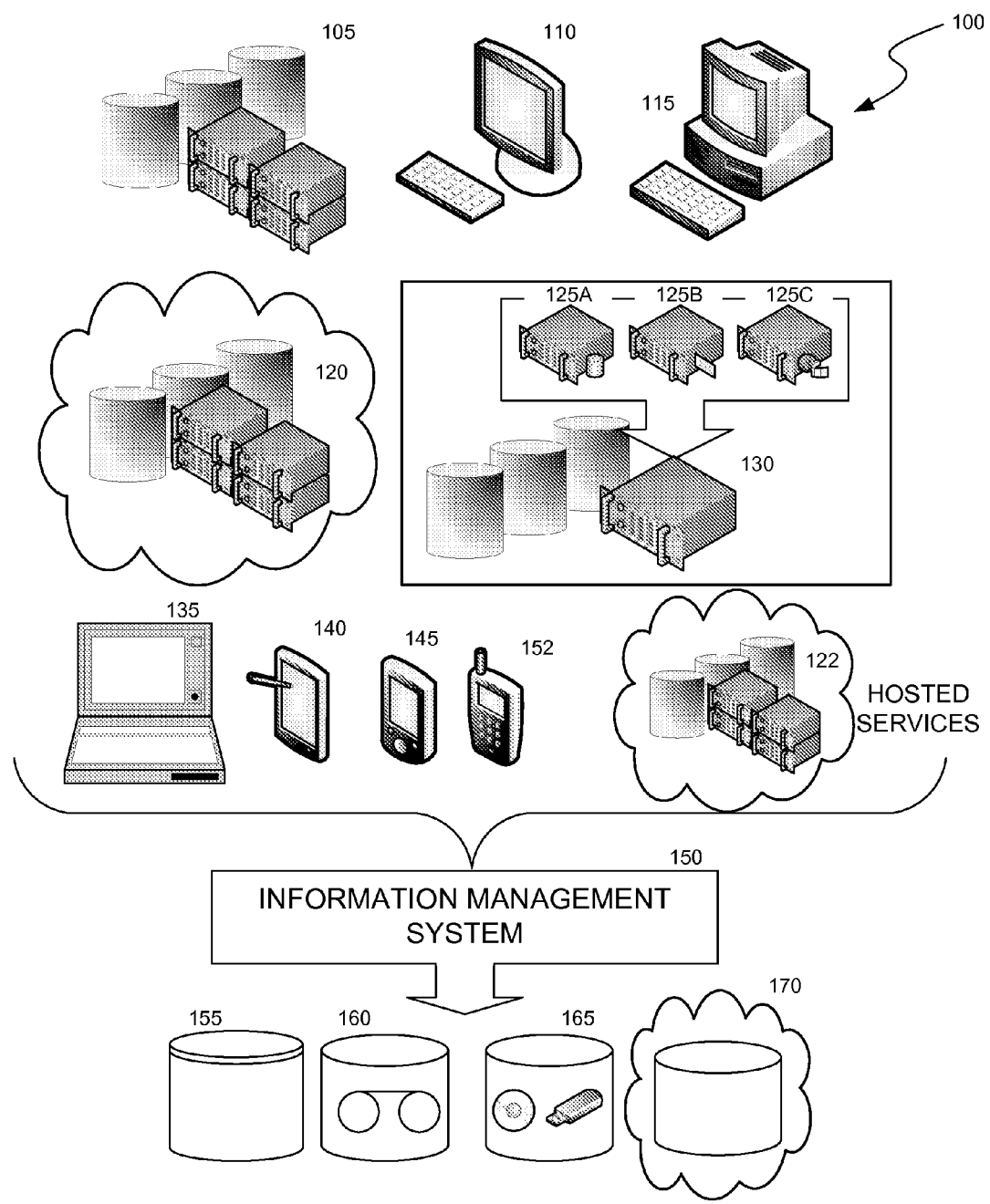
FIG. 1 is a block diagram illustrating an example of a suitable information management environment in which aspects of the inventive systems and methods may operate.

The system described herein provides techniques that can use deduplication information on a source computer platform to improve the process of performing data backups or restoration from/to the computer platform. In one example aspect, a data backup operation can re-use some of the work already done by a source computer's deduplication system. For example, a storage operation could read a deduplication database on the source computer platform to determine the duplicativeness of a given data chunk being transferred to a backup storage system, without having to perform computations such as data chunk hashing and comparison with previously generated hashes. Some embodiments may additionally or alternatively reuse hashes generated by the source computer during deduplication of the data file on the source computer's file system during deduplication at the external backup storage system.

Some data backup storage systems reduce redundancy in data before storing the data on backup storage such as a tape or a hard disk array. Deduplication is one of the several techniques used for reducing data redundancy. A typical deduplication operation processes a data file to be stored as a sequence of multiple overlapping or non-overlapping packets, typically having a fixed size. For every next data packet, a determination is made about uniqueness or duplicativeness of the data packet by matching the bit pattern with previously seen bit patterns. Often, the determination of duplicativeness is performed on a hash value of the data packet instead of the packet itself. The use of hash value-based duplication matching may reduce computational complexity. As an illustrative example, in a backup process, a file may be split into 32 Kbyte data packet, and a 64 byte hash value may be computed for each 32 Kbyte data packet. Several techniques are well-known to select a hashing algorithm that guarantees unique, or almost unique ("cryptographically unique"), one-to-one correspondence between a data packet and a corresponding hash value. Duplication determination may be performed on the 64 byte hash values instead of the 32 Kbyte packets, thereby providing significant computational savings. A data packet whose hash value matches with a previously seen hash value is stored as simply a stub (e.g., a pointer) to the previous occurrence of the same pattern (i.e., same data packet). A data packet whose hash value does not match with any of the previously seen hash values may be stored and the corresponding "new" hash value is added to a table of hash values for future comparisons. Because some data packets (e.g., 32 Kbyte packets) may be replaced with a stub (e.g., a 32 byte pointer) during storage, significant storage space savings can be achieved.

Broadly and in general terms, a data deduplication operation thus uses computational resources for determining hash values for data blocks or data chunks to be backed up and resources for determining uniqueness or duplicativeness of a data block (data chunk). In addition, deduplication operations also use storage resources to maintain a database of unique data chunks, hash values and a database of pointers (together called a deduplication record) linking backed up data to the unique data chunks. The resources used during the data deduplication operation could be, e.g., processor resources, program execution memory storage resources, data bandwidth resources, etc.

Similarly, when restoring data from a backup data archive to a file system, the backup system may need to restore, decompress or rehydrate, file data from deduplicated format to its "native" non-deduplicated version. For example, a restoration process may access a backed up data chunk, determine whether the data chunk is unique or deduplicated (e.g., by looking up the deduplication record), and rehydrate the data chunk on the file system accordingly.

The inventors have noticed that many new computer operating systems have begun using de-duplication to natively store data files (production data, as further explained below) on the source computer. For example, operating systems (OS) such as Solaris and Windows 8 store user files in a proprietary deduplicated format. While the use of deduplication provides benefits to the source computer by reducing the amount of storage space needed to store the file system, the deduplication format is typically kept unknown or "transparent" from a user or another application that is running on the operating system. For example, the only way an application (e.g., a backup operation) can gain read/write access to files stored by the operating system may be after the files are rehydrated by the operating system. In other words, at the application layer, or from the viewpoint of a non-OS process or module, a deduplicated native file system looks no different than when the file system is not deduplicated.

The present system provides several techniques that can be used by a backup or a restoration process to detect whether a source file system is natively stored in a deduplicated format and to benefit from the deduplication used on the source file system. For example, presently disclosed techniques can be used to improve a backup operation by reducing the computing, bandwidth and storage resources used by the backup or restoration operation, thereby benefitting from the work performed by a client computer's OS in deduplicating the data to be backed up. In some implementations, the disclosed techniques can re-use the uniqueness/duplicativeness information about data chunks available from the source file system, thereby eliminating a backup storage system having to perform similar computations. A backup operation may be able to re-use hash values computed by the deduplication engine of the OS during its own deduplication process. The backup system may be able to restore files from a backup archive to a computer, by only transferring unique data chunks, and updating deduplication database on the computer, thereby significantly reducing data bandwidth used during data restoration operation.

In one exemplary aspect, a disclosed method of backing up data from a source file system of a computer device to a backup data storage system includes checking whether a source file is stored on the source file system in a deduplicated format. when the checking indicates that the source file is stored in a deduplicated format, then a block size value used to store the source file in the deduplicated format is determined. Without a file read/write assistance from an operating system running on the computer device, a local deduplication database is accessed to determine a location of a first data chunk of the source file stored in the deduplicated format on a local storage device. The source file is backed up by accessing and selectively transferring the first data chunk and successive data chunks of the source file by transferring a given data chunk, if the local deduplication database indicates that the given data chunk was not deduplicated and transferring a deduplication record, without transferring the given data chunk, if the local deduplication database indicates that the given data chunk was deduplicated. When the check indicates that the source file is stored without deduplication on the computer device, then the source file is backed up by transferring data chunks of the source file to the backup data storage system and performing deduplication on the data chunks of the source file.

In another exemplary aspect, a computer program product comprising a computer-readable medium having instructions stored thereon, is disclosed. The instructions, when executed by a processor cause the processor to implement the above-described method.

In yet another exemplary aspect, techniques for implemented a method of restoring data from a data storage system to a source file system that can store files in a deduplicated format are disclosed. A block size value used to restore a copied file in the deduplicated format is determined. For each data chunk of the copied file, if the data chunk was not previously transmitted during the restoration, then: the data chunk is transferred to the source file system, and a deduplication database at the source file system is updated with a pointer a location where the data chunk is transferred to. If the data chunk was previously transmitted during the restoration, then the deduplication database at the source file system is updated without transferring the data chunk with a deduplication entry.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPS), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010-0332456, which is hereby incorporated by reference herein in its entirety.

Figure 2:
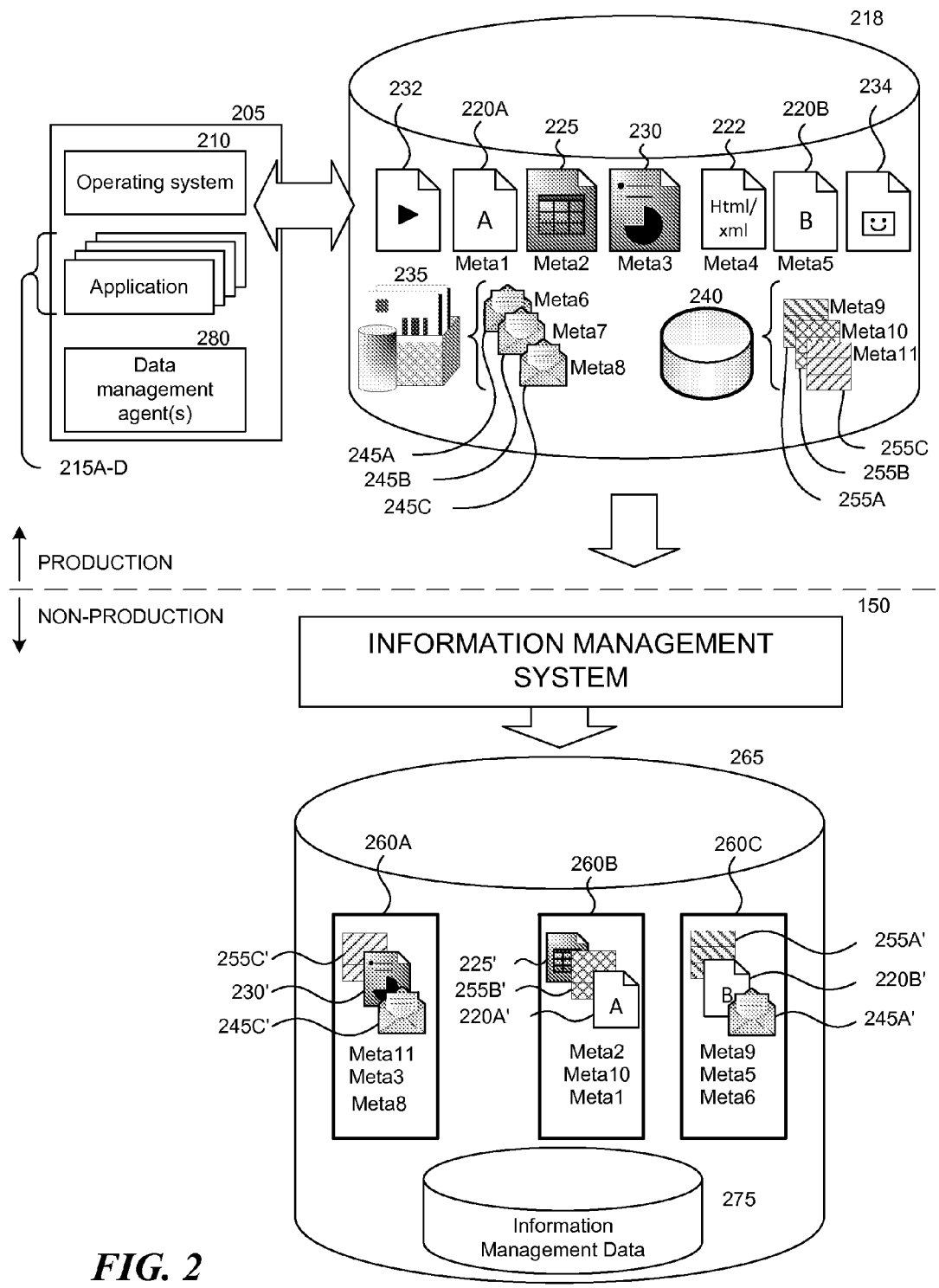
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
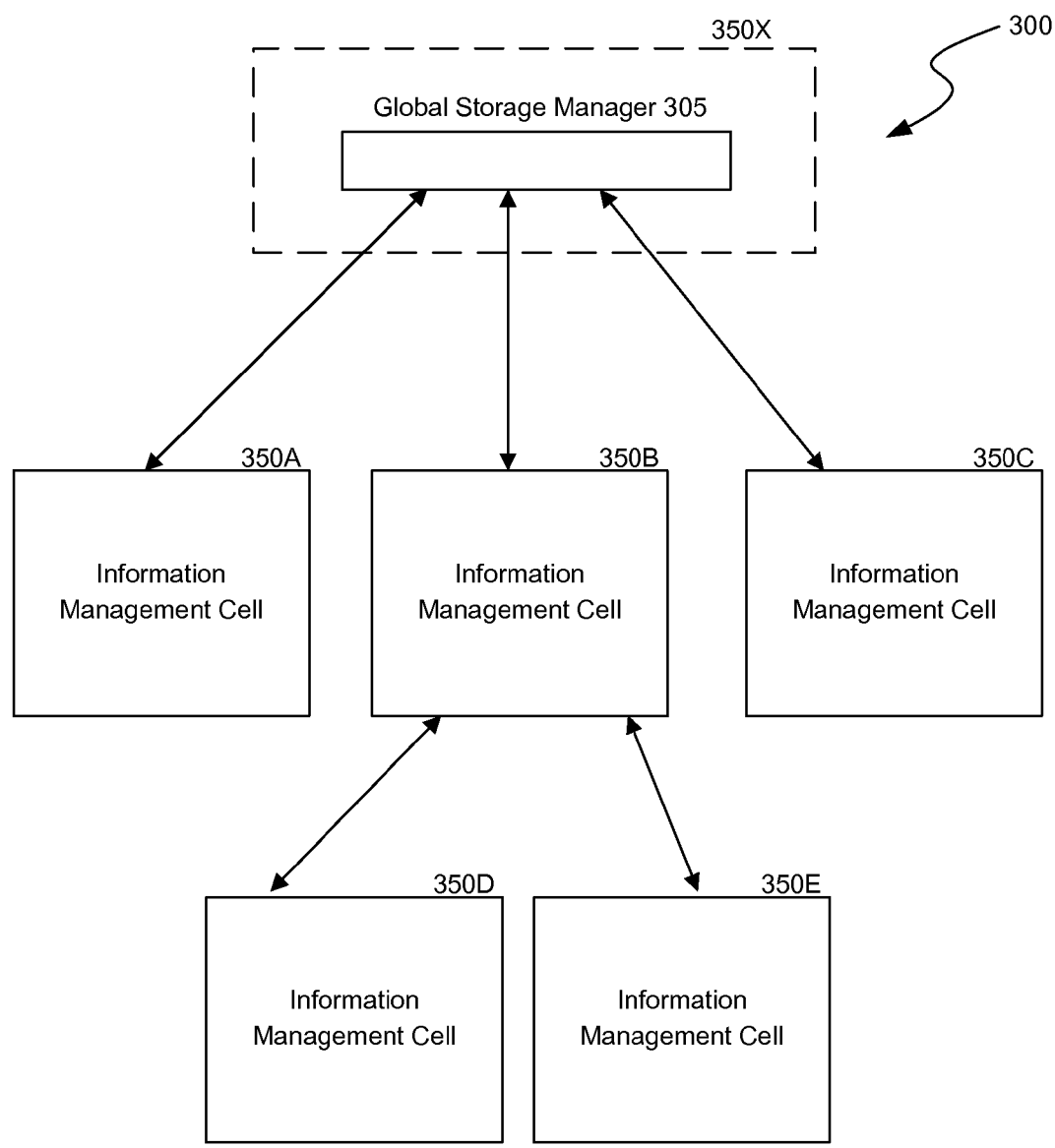
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
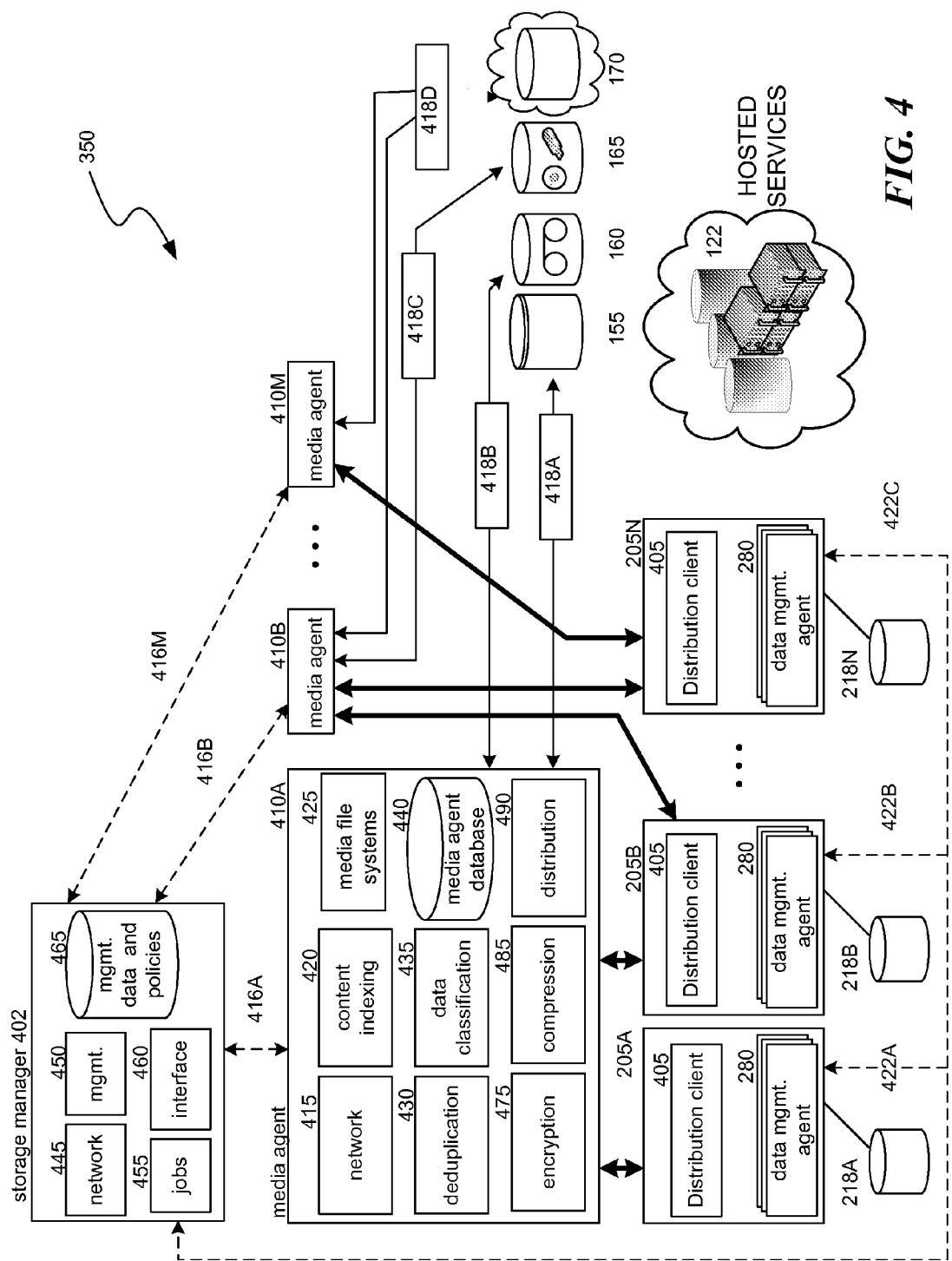
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-70, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced more fully and incorporated by reference above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each includes a set of criteria and rules associated with performing an information management operation. The criteria may be used to determine which rules apply to a particular data object, system component, or information management operation, an may include:

frequency with which a production or non-production copy of a data object or metadata has been or is predicted to be used, accessed, or modified;
access control lists or other security information;
the sensitivity (e.g., confidentiality) of a data object as determined by its content and/or metadata;
time-related factors;
deduplication information;
the computing device, hosted service, computing process, or user that created, modified, or accessed a production copy of a data object; and
an estimated or historic usage or cost associated with different components.

The rules may specify, among other things:
a schedule for performing information management operations,
a location (or a class or quality of storage media) for storing a non-production copy,
preferences regarding the encryption, compression, or deduplication of a non-production copy, resource allocation between different computing devices or other system components (e.g., bandwidth, storage capacity), whether and how to synchronize or otherwise distribute files or other data objects across multiple computing devices or hosted services, network pathways and components to utilize (e.g., to transfer data) during an information management operation, and retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-70. Each media agent 410 may control one or more intermediary storage devices 418, such as a cloud server or a tape or magnetic disk library management system, to read, write, or otherwise manipulate data stored in a non-production storage medium 155-70. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse"

sessions to permit communications between different computing devices so that the devices can interchange data and metadata or so the devices can provide computing resources, such as applications, to each other.

Data Backup Using De-Duplication Information

Figure 5:
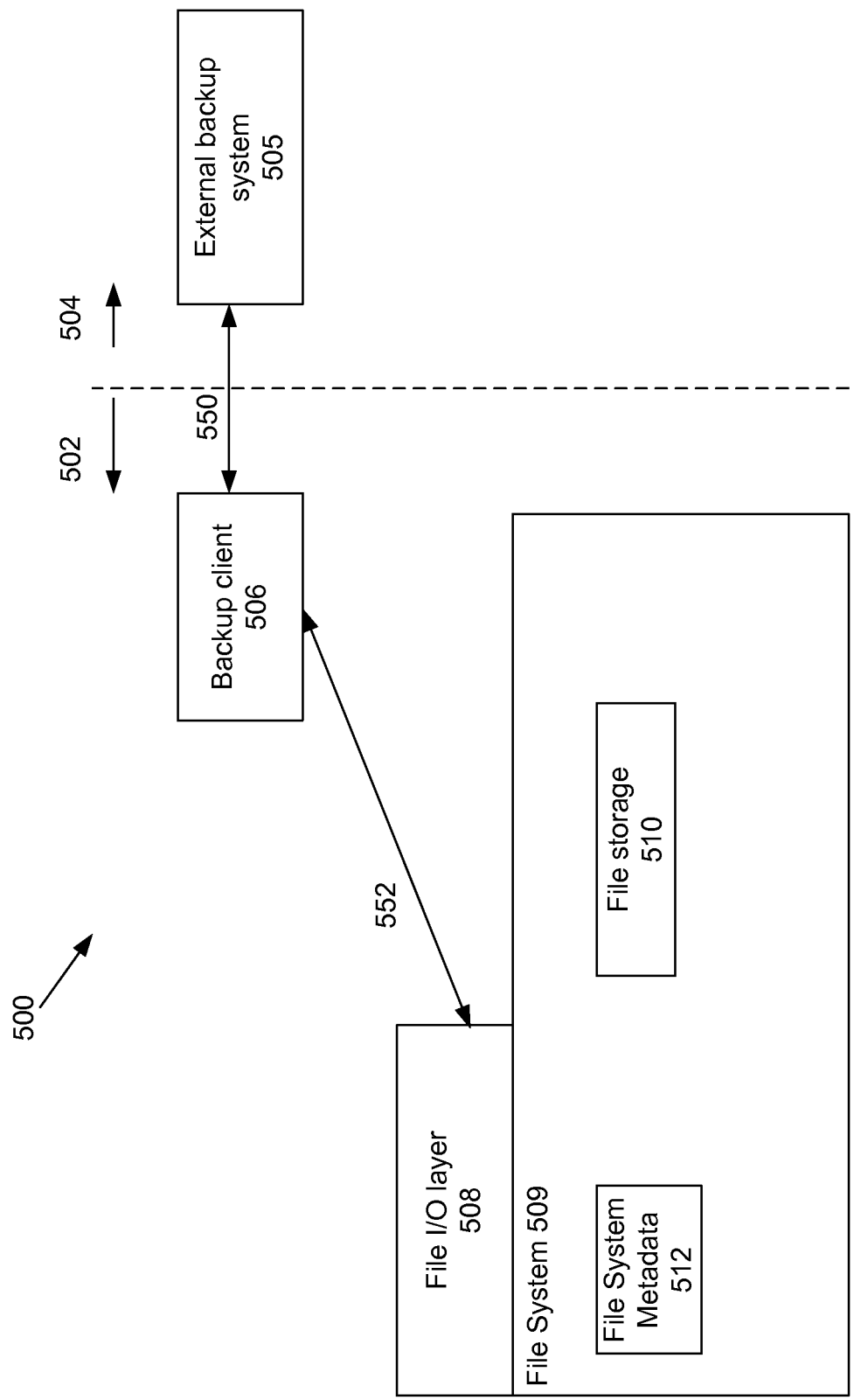
FIG. 5 is a block diagram representation of a backup system that includes a client computer having a file system that does not use de-duplication and an external backup storage system that performs de-duplication.

FIG. 5 is a block diagram illustrating functional modules of a backup system 500 that includes a source computer (502), also called a client computer, that stores production-data without using de-duplication and/or an external backup storage system (504) that sometimes includes ability to perform de-duplication in the external backup system 505. The source computer 502 may be, e.g., the computing device 205, discussed above with respect to FIG. 2. On the client-side 502, a file system 509 may include a file storage 510 and corresponding file system metadata 512. The files in the file system 509 is made available to external applications and functional modules, such as the backup client 506, via a file input/output layer 508 that is accessible through a communication interface 552. While the term "backup" is used herein, it is intended to include any copy, thus a backup operation may generate any type of non-production copy noted above.

In various implementations, the client computer 502 may be, e.g., a user's computer, laptop, tablet, smartphone, a file server or an e-mail server, and so on. The client computer 502 may be embodied using any operating system (e.g., Windows, OS, X, Linux, Solaris, etc.) and hardware platform (e.g., x86, ARM, etc.).

The file storage 510 stores various files in directories. The stored files may be stored in fragmented or un-fragmented formats. The file storage 510 does not store files in de-duplicated formats but store production data in native, though fragmented or un-fragmented, formats. In the fragmented format, a file may be stored in several smaller data chunks that are stored at non-contiguous memory addresses that are linked together, e.g., by a linked list of pointers to next fragments. In the un-fragmented format, a data file may be stored in contiguous memory locations as a single block of data.

In some implementations, the file system 510 may be a file system under Windows 7 or an earlier operating system released by Microsoft Corporation. These operating systems generally store user files and other data in a format that does not use de-duplication. In such a format, individual files are accessible on their own, i.e., without a need to access data blocks that are commonly shared with other files stored on the file storage 510.

A data backup operation in the system 500 may proceed as follows. The backup client module 506 may be instructed to begin a data backup operation. The instruction may come from a user or from an automated scheduler (e.g., once-a-week backup or other periodic instruction). The instruction may identify which files are to be backed up. For each file to be backed up, the backup client 506 may access the file by communicating with the file I/O layer 508 over the link 552 (e.g., software APIs), obtaining the file (possibly in smaller pieces) and transferring the file over the communication link 550 to the external backup system 505. The external backup system may perform a redundancy reduction operation such as the previously described deduplication operation and store the file on an external backup storage media. In this backup process, a 10 Mbyte file, e.g., will use 10 Mbytes of transfer bandwidth over the communication link 550.

Figure 6:
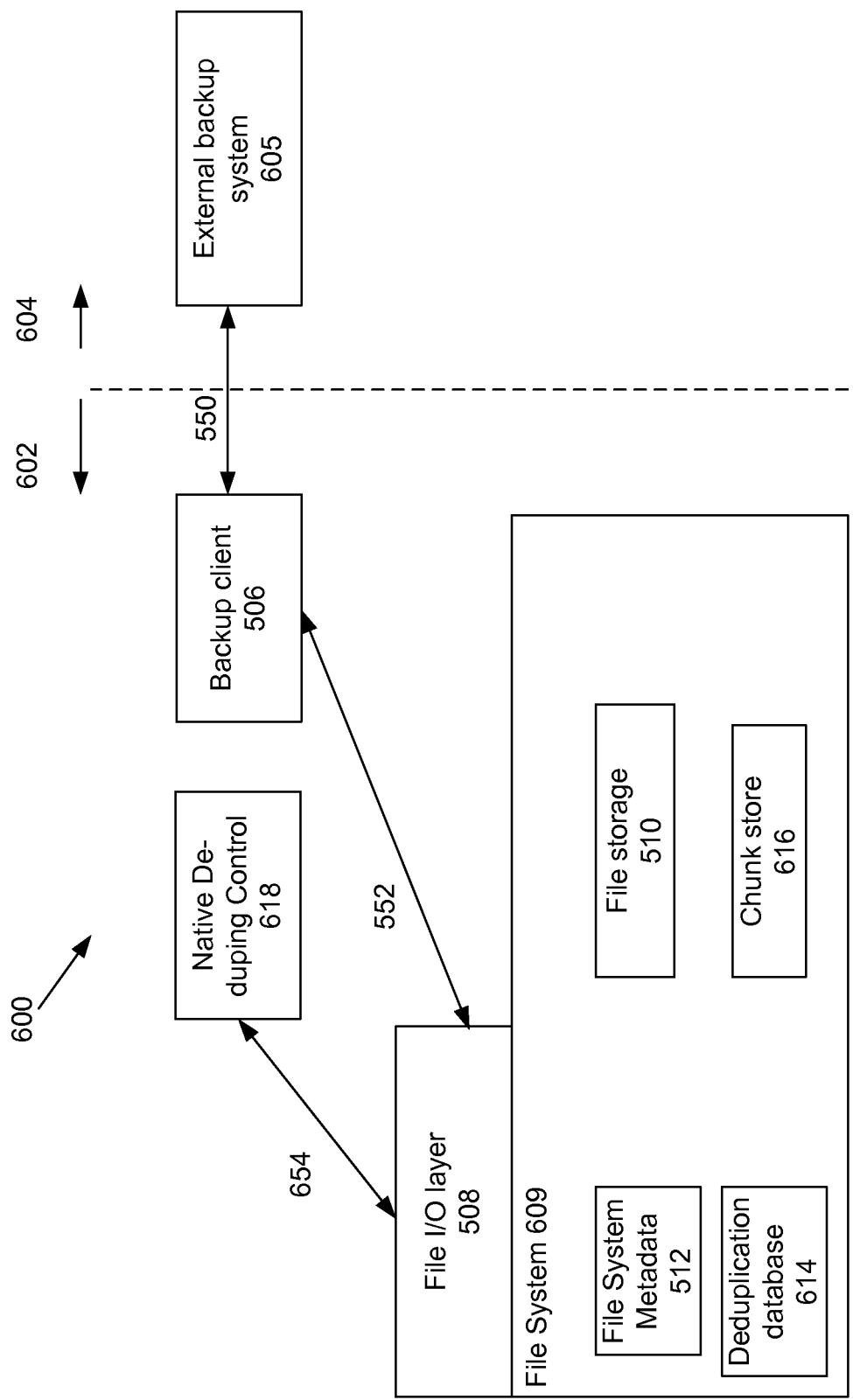
FIG. 6 is a block diagram representation of a backup system that includes a client computer having a file system that uses de-duplication and an external backup storage system that independently performs de-duplication.

FIG. 6 is a block diagram illustrating a backup system 600 that includes a client computer 602 with a source file system 609, such as Windows 9 or OpenSolaris. In contrast to the source file system 509 described in FIG. 5, the source file system 609 can store data files both in de-duplicated and also in non-deduplicated format. The system 600 also includes an external backup storage system 604 having an external backup system 605 for backing up, possibly deduplicating, and restoring the source file system 510. The client computer 602 may further include a native deduplication control module 618, which may be part of the source file system 609 and/or file system 609. The module 618 may control a variety of operational aspects of creating and maintaining the chunk store 616 which stores data chunks for files that are de-duplicated, and deduplication records that are generated during deduplication and used during restoration of files stored in deduplicated format in the chunk store 616. In some implementations, the module 618 may communicate with the file i/o layer 508 through the interface 654. For example, for a file read operation received by the file i/o layer, the module 618 may check whether the file is deduplicated or not. Similarly, for a file write operation received by the file i/o layer, the module 618 may control whether and where to save the file on the file system 609 and also control the deduplication process and updating the deduplication records.

However, in system 600, the module 618 does not make available to other applications (e.g., the backup client 506) the deduplication information or provide other applications with access to the chunk store 616 and the deduplication records 614. Therefore, data backup or restoration operations in the system 600 proceed similarly as described with respect to system 500. In other words, without access to the deduplication information, data transferred over the link 550 during a backup or restoration operation will be equal to the total size of volumes or directories being backed up or restored because only rehydrated data is provided by the native deduplication control module 618. Also, any deduplication performed by the backup storage system 605 will be independent of any computations or records controlled by the native deduping control module 618.

Figure 7:
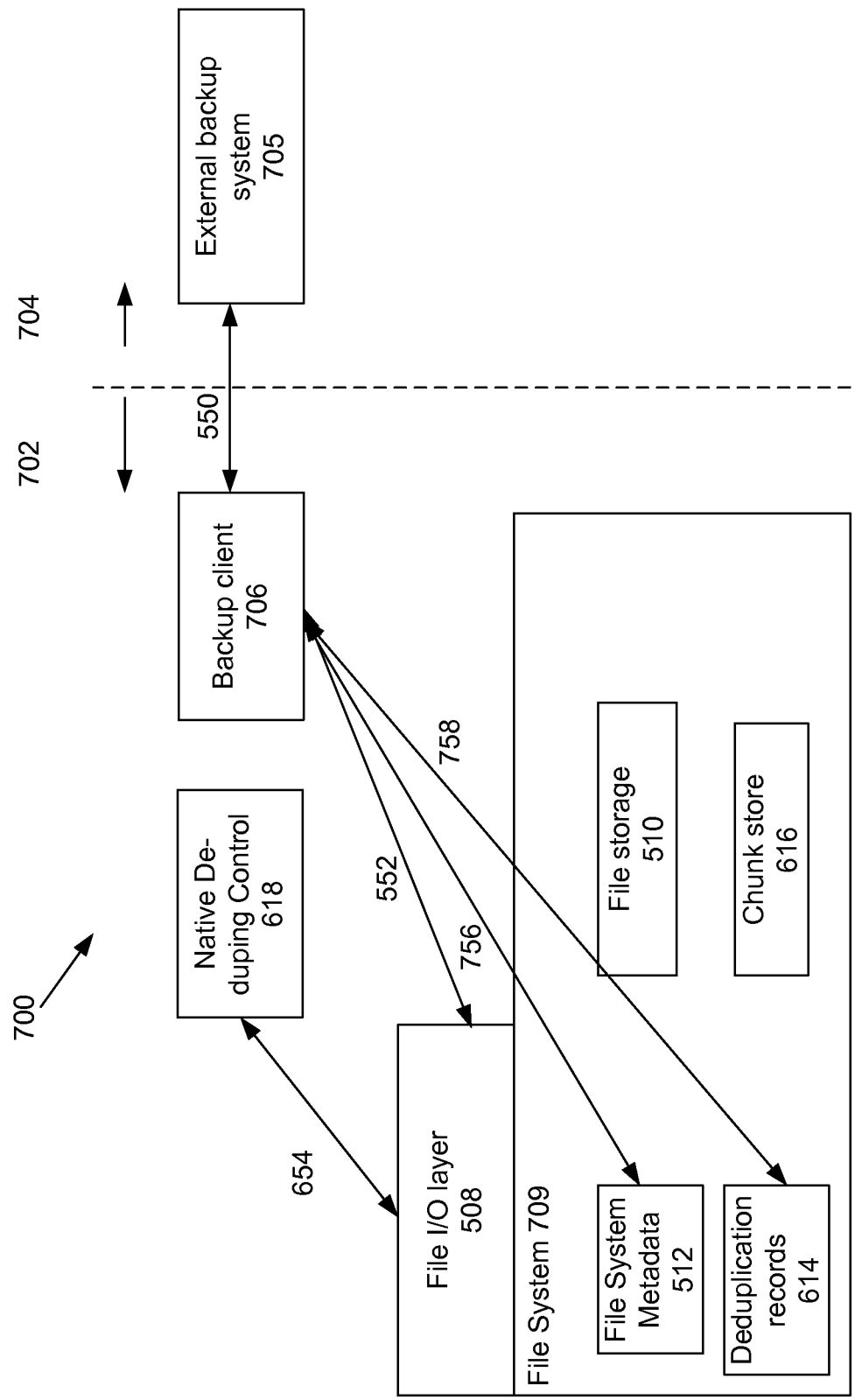
FIG. 7 is a block diagram representation of a backup system that includes a client computer having a file system that uses de-duplication and an external backup storage system that performs de-duplication by re-using de-duplication information from the file system.

FIG. 7 is a block diagram illustrating a backup system 700 in which the external backup storage system 704 includes an external backup system 705 that is able to re-use and benefit from deduplication computations performed at the client computer 702. The backup client module 706 is able to access not only the "regular" (e.g., non-deduplicated) files stored in the file system 709 (e.g., file storage 510), but is also able to read from (and optionally write to) the chunk store 616 and the deduplication records 614, as indicated by communication links 756 and 758 and further described in greater detail below.

Figure 8:
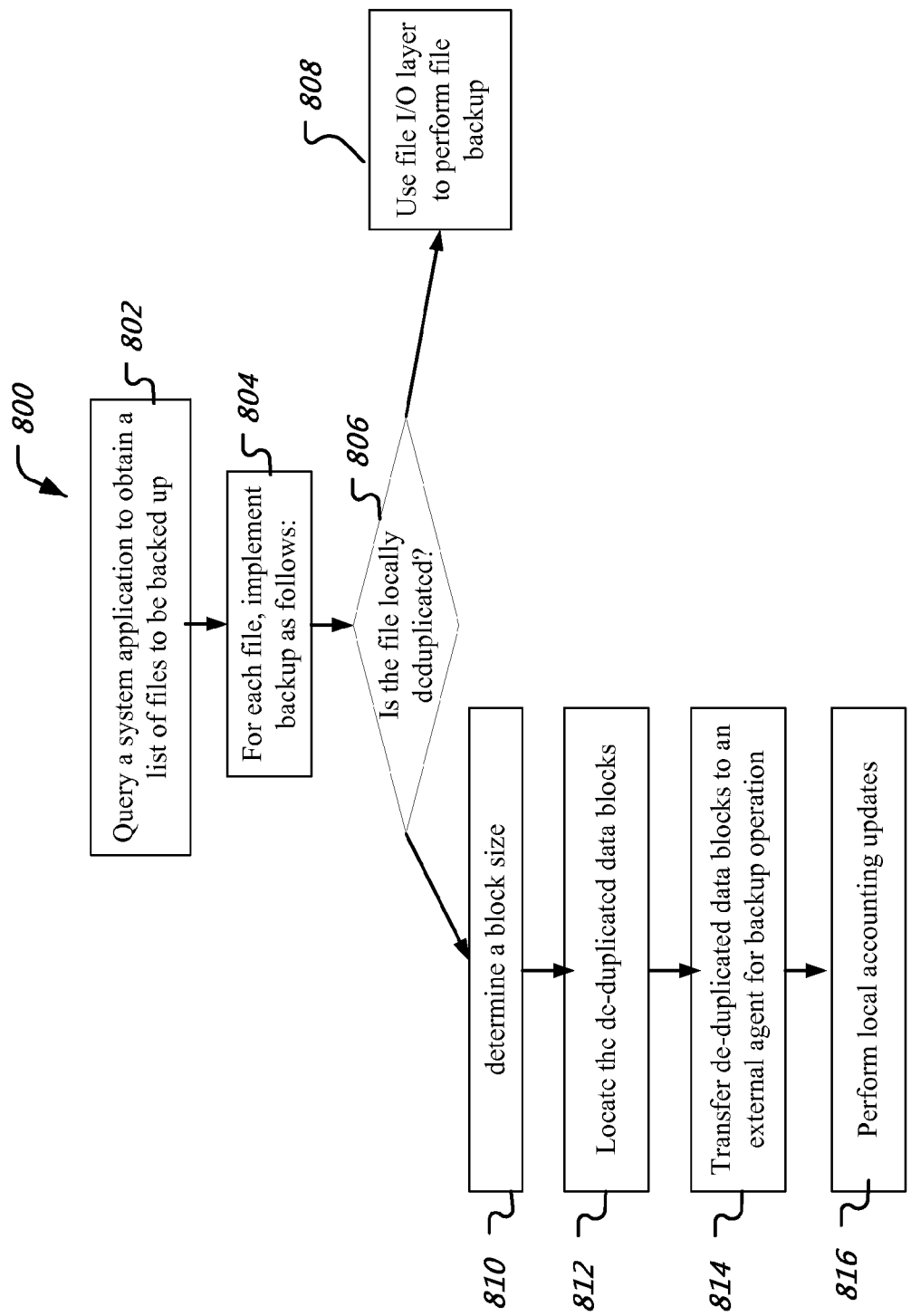
FIG. 8 is a flowchart representation of a data backup procedure that uses de-duplication information from a source file system that is being backed up.

FIG. 8 is a flowchart 800 depicting operation of the backup client module 706. At 802, the backup client module 706 queries a system application running on the client computer to obtain a list of files to be backed up, or otherwise receives a list of file to be copied. At 804, for each file to be backed up, the procedure as described below is implemented.

At 806, a check is made to find out whether a given file to be backed up is locally deduplicated on the source file system. If the file is not de-duplicated, then the traditional file I/O, e.g., by making file read/write calls to the operating system of the client computer, is used to perform data backup.

If it is determined at 806 that a given local file to be backed up is locally stored in a deduplicated format, then, at 810, the backup client module 706 determines the deduplication block size used for the de-duping format of the source file system/operating system. In various implementations, the block size may be determined using one or more of a variety of different techniques. For example, in some implementations, based on the operating system running on the client computer 702, the backup client module 706 may have a priori knowledge that a given block size is used for deduplication for all files stored in the chunk store 616. However, some operating systems may use different data block sizes for deduplicating files, based on file type or volume, or the directory or the user who created the filed, and so on. Therefore, the backup client module 706, in general, may need to determine deduplication block size on a file by file basis.

When the information is available by making a query to the native deduping control module 618, an API call may provide this information to the backup client module 706. As an example, the API call may include a filename parameter that identifies a file for which the query is made. In response, the deduping control module 618 may provide a deduplication block size. The native deduping control module 618 may also provide additional information such as a pointer to a location at which hash values and deduplication database for the file are stored.

Alternatively, a variety of "blind" (i.e., without assistance from the file system 709 or the operating system running on the client computer 702) approaches or processes may be taken. Using one such blind approach, the backup client module 706 may query a table that includes entries of operating system versions, and corresponding rules used by the operating system in selecting deduplication data block size(s) for files. This table may be stored locally at the backup client module 706 or externally at the backup system 705.

Another process is to use a same deduplication data block size of a file previously backed up from the same directory or of the same file type. For example, the same data block size may be used for all text files and another data block size may be used for all image files, and so on.

Another process is based on a trial and error method in which, knowing a type of the file (e.g., a spreadsheet or a presentation), different deduplication data block sizes will be tried to access data from the chunk store 616, and the data thus obtained may be compared with the expected byte pattern based on the file type to determine the most probable deduplication data block and then using the same during the backup operation.

Another process based on a trial and error approach first attempts to compress a file being tested using a given data compression algorithm (e.g., zip or some other well-known algorithm or technique). Based on how much compression is achieved, the process may formulate an estimate of the length of deduplication. For example, the process may assume an inverse relationship between the amount of compression that can be achieved and the deduplication data block size. That is, a file that can be more compressed may be assumed to have a high value of block size (e.g., 32 Kbytes) than another file that does not get compressed as much (e.g., 1024 bytes).

In some implementations, when the backup client module 706 is not able to determine with a sufficiently high degree of confidence what the deduplication data block size is, it may revert back to accessing the file through the file i/o layer 508, using previously described backup process with respect to FIGS. 5 and 6.

At 812, the backup client module 706 then locates the de-duplicated data blocks, or data chunks, that make up the given local file to be backed up (e.g., data chunks that are uniquely present in that file and data stubs). At 814, the de-duplicated data blocks are transferred to an external agent (e.g., backup storage system) for backup operation. After the transfer of the file is completed, a local accounting database may be updated at 816 to indicate that the given file was backed up.

To illustrate bandwidth savings achieved by a backup operation as described above, a simplified example is given below. In this example, a 64 Megabyte file is to be backed up to external backup storage. Without using de-duplication information, the file will be backed up by transferring 64 Mbytes of data over the communication connection (e.g., element 550 in FIG. 5, 6, or 7). Assume that the file is deduplicated using block size 32 Kbytes. Without de-duplication, the file will therefore have 2,000 data chunks, each having 32 Kbyte lengths. After de-duplication is performed, it is determined that 400 of the 2,000 chunks occur more than once. Therefore, in the deduplicated format, the file may be stored as 1600 data chunks of 32 Kbytes each, that uniquely occur in the file, plus overhead information for the remaining 400 chunks that are duplicative. The overhead information may be stored in records, which are 64 bytes long each. Therefore, a 64 Mbyte file can be stored in the de-duplicated format in 1600*32 Kbytes+400*64 bytes, or 51.2256 Mbytes—thereby reducing storage and transfer bandwidth needed for backup by almost 20 percent! In practice, greater savings can be obtained by selecting different values for the block size depending on the file type.

Figure 9:
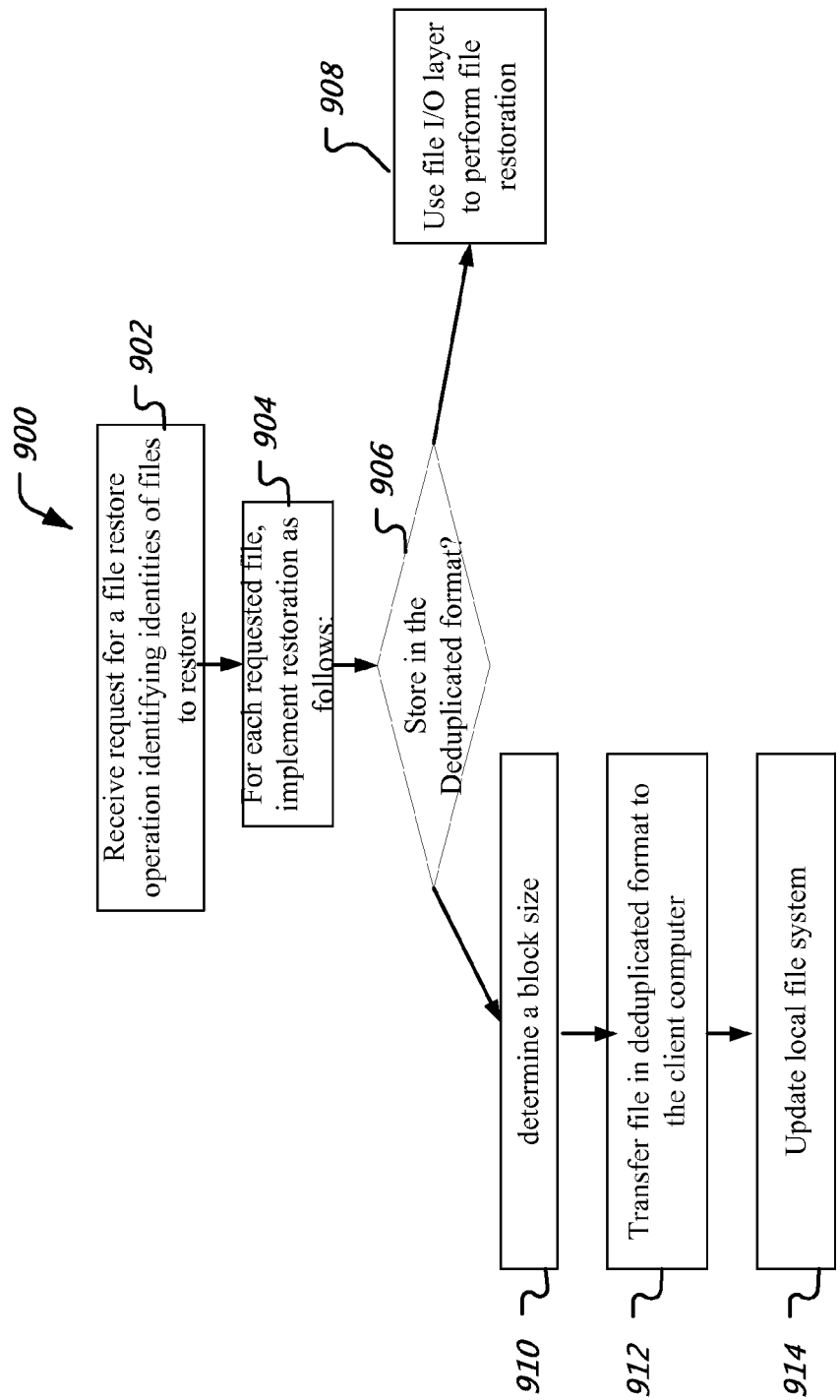
FIG. 9 is a flowchart representation of a data restoration procedure that provides de-duplication information to a source file system that is being restored.

FIG. 9 is a flowchart depiction of a process 900 of restoring backup data from a backup storage system to a source file system. The process 900 may be performed, e.g., by the backup client module 706 and the backup storage system 705.

At 902, the process receives a request for file restoration operation. The request may include information about which files to restore and where to restore them to. The request may be received from the storage manager noted above as part of a storage policy or storage schedule, or from a user. The request may be received at the backup client module 706, e.g., by a user or administrator of the client computer 702, or at the backup storage system 705.

At 904, for each requested file, the process may perform the following restoration procedure.

At 906, the process makes a determination about whether to store the file in a deduplicated format. The backup storage system 705 or the backup client module 706 may make the determination in many different ways. For example, backup metadata corresponding to the file being restored may have been saved during the backup operation (e.g., process 800) and may indicate whether the file was originally stored on the source file system in a deduplicated format. The same deduplication data block size, as determined during the backup process 800, may be used during restoration. As previously discussed, the determination may also depend on file type, target directory, user/owner of the file, the version of the operating system on the client computer, and so on.

At 908, when the process determines that the file is not to be restored in a deduplicated format, the file is restored to the client computer using file i/o layer of the client computer, as previously described.

At 910, when the process determines that the file is to be restored in a deduplicated format, as previously discussed, the process determines the deduplication block size.

At 912, the process transfers the file being restored (e.g., over the link 550) in the deduplication format. Various deduplication formats are described below with reference to FIGS. 10A, 10B and 10C.

At 914, the process restores the file on the client computer and updates the local file system accordingly. For example, all data chunks of the file are stored in the chunk store 616, the deduplication records 614 are updated, if needed, to correspond to the restored file (e.g., hash values, data block size etc. are added or corrected in the deduplication records 614). In addition, the native deduplication control module 618 may also be informed that the file is restored. In some implementations, the native deduplication control module 618 (or the file i/o layer 508) may be informed through an API call that the restored file was recently modified, thereby having the native deduplication control module 618 run its own deduplication process.

FIG. 10A depicts format 1000 for transferring file data between the client computer 502 and the external backup storage system 504. A file may be transferred as a sequence of data chunks 1002, which are not in de-duplicated format. The data transfer may often be done using uniformly sized data blocks (e.g., 1024 byte blocks), except possibly for the last block of a file, which may have a different size based on the total file size. However, in general it is possible for implementations to use different data chunk sizes during data transfer, subject to run-time criteria such as available bandwidth on the link 550, number of simultaneous files being backed up, the size of the packet used for the file transfer (e.g. internet protocol (IP) packet size), and so on. The format 1000 may be used, e.g., for data backup and recovery as described with respect to FIGS. 5 and 6.

FIG. 10B shows a file transfer format 1020 that may be used for transferring deduplicated files during data backup and restoration operations, e.g., as described in FIG. 7. Data chunks 1 to N (N positive integer) 1022 may represent unique data blocks found in a given file being transferred. Stubs 1024 may represent, e.g., pointers P1 and P2, to a data chunk that was previously sent and matches the data chunk at that position in the file. The relative sizes of boxes 1022 and 1024 indicates that compression is achieved in the format 1020, compared to format 1000, because the stubs 1024 would typically have a much smaller size than the data chunks 1022.

As previously described, the pointers P1 and P2 provide information to a receiving side about how to rehydrate the data chunk at that location from one of the data chunks that was previously transmitted to the receiving side. Depending on how the source file system had performed its deduplication, the pointers may point to data chunks within the same file, or the same group of files (e.g., same directory or directories or all files selected for the backup operation), or the same volume (e.g., hard drive). The previously described client backup module 706 may therefore perform an integrity check on the data stubs (e.g., pointers) being sent in the file transfer format 1020 to ensure that the pointers are pointing to data chunks that are also being sent to the backup system or may have previously been sent to the backup system.

As an illustrative example to highlight the importance of the integrity check, consider for example a case in which a file was deduplicated by the source file system using hash computations and data chunk uniqueness over all files within the same directory. Therefore, some of the pointers in the deduplicated format of the file may be pointing to data chunks in other files in the same directory. Now, if only the file, but not any other file in the directory is sent to the backup storage system, at the backup storage system, the pointers pointing to the other files cannot be used to recover the original data chunks in the file being backed up because the backup storage system does not have access to the other files.

FIG. 10C represents yet another file transfer format 1030 that may be used for backing up/restoring files. In the file format 1030, files are transferred using a format similar to the above-described format 1020. In addition, deduplication records pertaining to the file may also be transferred. Deduplication records may include, e.g., hash values 1 through K (K a positive integer that is equal to or smaller than N). In some implementations disclosed in the present document, the hash values 1032 may be re-used by the backup storage system 705.

Figure 11:
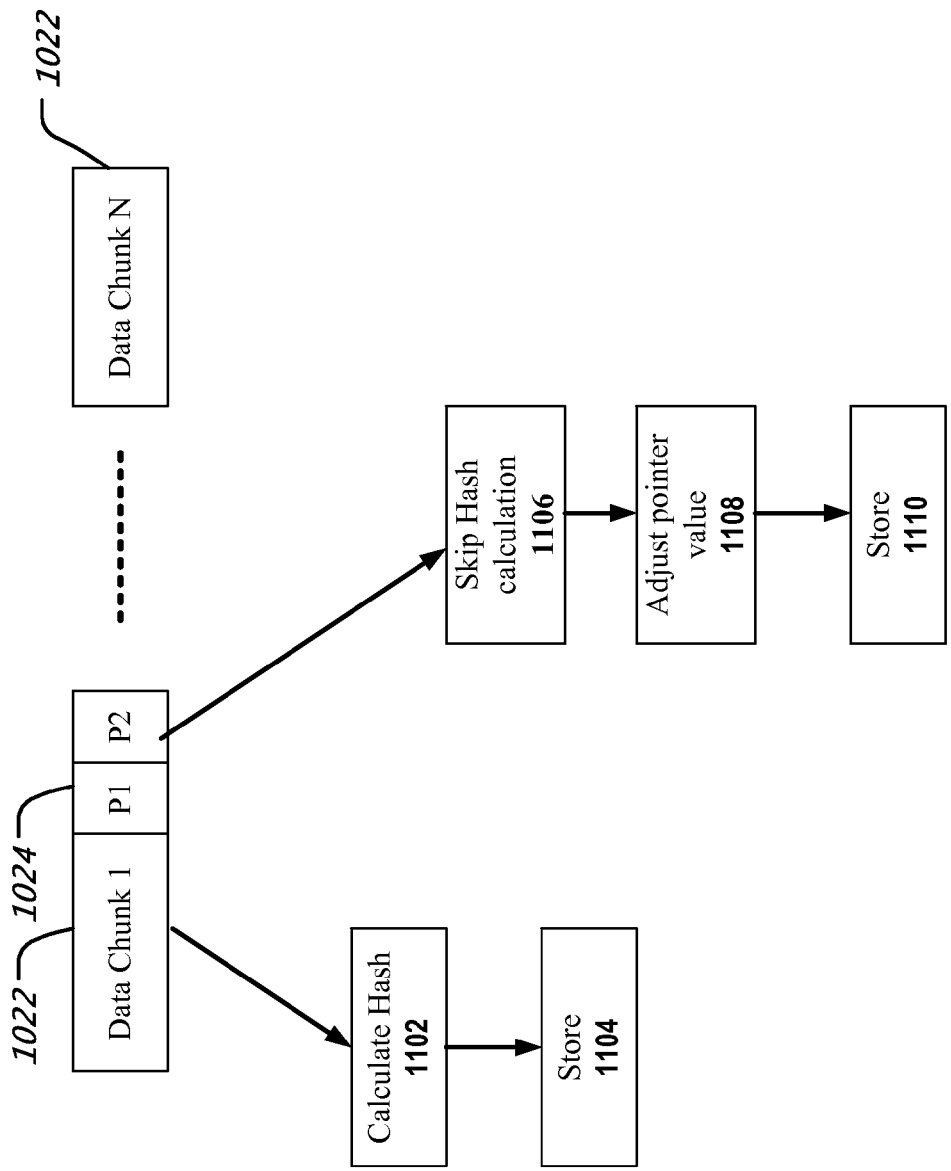
FIG. 11 illustrates processing of data transferred between a source file system and a backup storage system during data backup or restoration operations.

FIG. 11 illustrates processing performed by the backup storage system 705 upon receiving a file using the file transfer format 1020. First, the backup storage system 705 may determine whether a received next portion of the file transfer byte stream is a data chunk or a pointer. If the portion is a data chunk, then the backup storage system 705 calculates a hash value at 1102. The hash value is calculated using a hashing algorithm that, in general, may be different from the hashing algorithm used by the source file system for its deduplication. After the hash value is calculated in 1102, the backup storage system 705 then performs deduplication based on the hash value and stores the data chunk (1104) either as a data stub (when there is a match) or hashes the data chunk itself (when there is no match), as is generally performed during deduplication.

For a data stub 1024 received, at 1106, the hash calculation is skipped by the backup storage system 705 because the presence of the data stub 1024 already indicates that the corresponding data chunk was previously sent to the backup storage system 705. At 1108, the backup storage system 705 may adjust the pointer value 1024 from a format used by the client computer 502 to a format used by the backup storage system 705. For example, layout of the media on which the backup storage system 705 stores the backed up file may be organized differently than the source file system and therefore the backup storage system 705 may adjust the data stub 1024 to correctly point to the address or offset location on the media on which the file is being backed up. At 1110, the possibly modified pointer is stored in the deduplication records of the backup storage system 705 and the corresponding data stub is stored in the storage media.

Figure 12:
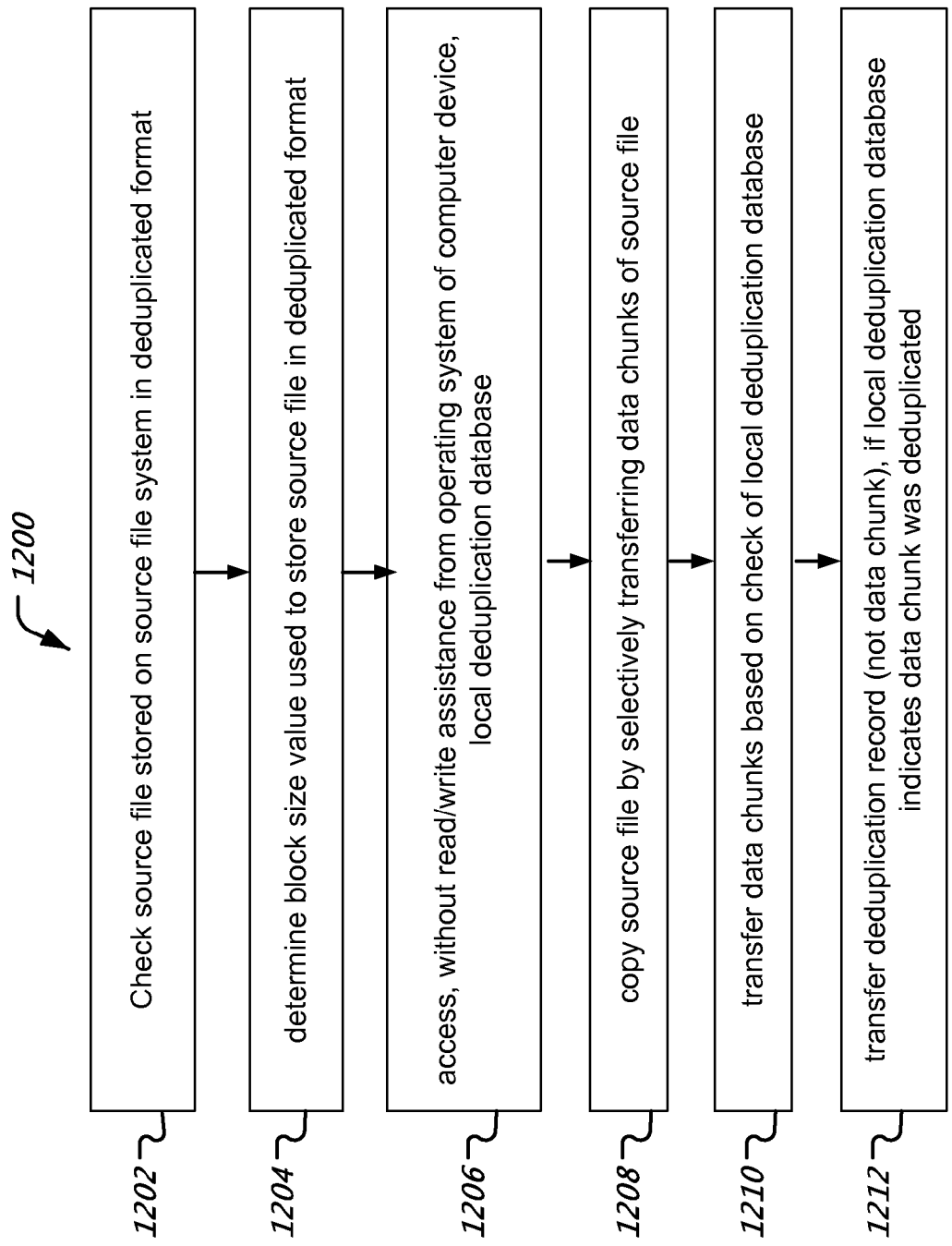
FIG. 12 is a flowchart representation of a process of backing up data from a source file system of a computer device to a backup data storage system.

FIG. 12 is a flowchart representation of a process 1200 of backing up data from a source file system of a computer device to a backup data storage system.

At 1202, the process checks whether a source file is stored on the source file system in a deduplicated format. In some implementations, the check may be based on a priori knowledge that the operating system running on the computer device used a de-duplication format for storing all its files. In some implementations, when a first file in the source directory is checked and determined to be in a de-duplicated format, it is assumed that all other files in the source directory are also de-duplicated. In some implementations, when it is determined that a file in a directory is stored in a de-duplicated format by the OS, then it is assumed that all files in child directories listed in the directory are also stored in a de-duped format.

In some implementations, the process make may the check about whether or not a file is stored in a de-duplicated format may be made without assistance from the operating system. Some operating systems may provide assistance, e.g., in the form of application programmer interface (API) calls, or pre-publishing information about how to ascertain whether or not a given file is stored in the de-duplicated format. A check without explicit assistance from the OS may be performed in a variety of ways. For example, in some implementations, a priori trial-and-error testing may be performed to devise a test strategy based on regular API calls to the OS (e.g., comparing actual hard disk usage with the file size declared by the OS to see if there is a mismatch). In some implementation, a file read operation may be performed by directly accessing a hard disk location and the data chunk read back may be tested against an expected bit pattern. For example, as previously discussed, an OS may make the hard drive location where the first data chunk of a file is stored, but may only allow read/write access transparently (i.e., without revealing whether de-duplication is performed by the OS). However, the OS may also permit raw read/writes from specific hard drive addresses. Also, files of known types (e.g., .doc files or .xls files) typically have known or predicable headers and byte patterns and reading a known format file and testing for these patterns may reveal whether the data chunk includes file data or is in a de-duplicated format (e.g., contains a pointer).

At 1204, when the checking indicates that the source file is stored in a deduplicated format, the process determines the block size value used to store the source file in the deduplicated format. The block size used for de-duplication may be determined based on a priori knowledge about the operating system running on the computer. The block size used for de-duplication may also be determined based on a trial-and-error approach, as outlined above with respect to de-duplication determination.

At 1206, without a file read/write assistance from an operating system running on the computer device, the process accesses a local deduplication database to determine a location of a first data chunk of the source file stored in the deduplicated format on a local storage device. The database may be read, e.g., using a priori knowledge about where the database is located (e.g., a memory location on a hard drive). Some operating systems may not provide API calls to be able to access the deduplication database directly. However, the deduplication database may be stored at a specific location for a given file or directory or volume.

At 1208, the process backs up the source file by accessing and selectively transferring the first data chunk and successive data chunks of the source file as further described below. As previously discussed, each source file to be backed up may be transferred data chunk by data chunk to the backup storage system. However, in various implementations, either the data chunk or a de-duplication record (e.g., a pointer and/or hash value) or both is transferred from the source file system to the backup storage system.

At 1210, a given data chunk is transferred only if the local deduplication database indicates that the given data chunk was not deduplicated. In other words, this may be the first appearance of the data chunk in the deduplication process and therefore may need to be transferred to the backup storage system.

At 1212, a deduplication record is transferred, without transferring the given data chunk, if the local deduplication database indicates that the given data chunk was deduplicated. For example, as previously discussed, when the source file system's deduplication record may indicate that the data chunk to be transferred is not unique (i.e., the same byte pattern was previously transferred), then instead of transferring the data chunk again, a pointer pointing to the earlier transferred copy of the same data chunk may be transferred. In a typical implementation, the byte size of the pointer may be substantially smaller than that of the data chunk. For example, as discussed earlier, the data chunk may be 16 or 21 Kbyte in length, whereas the pointer may by 64 bytes in length, providing a significant savings in the amount of data being transferred to the backup storage system.

In some implementations, as previously discussed, the deduplication record may include the hash value for the data chunk. The backup data storage system may re-use hash values from the source file system and therefore the hash values may be transmitted as a part of the deduplication record.

When the check (1202) indicates that the source file is stored without deduplication on the computer device, then the source file may be backed up by transferring data chunks of the source file to the backup data storage system and performing deduplication on the data chunks of the source file.

Figure 13:
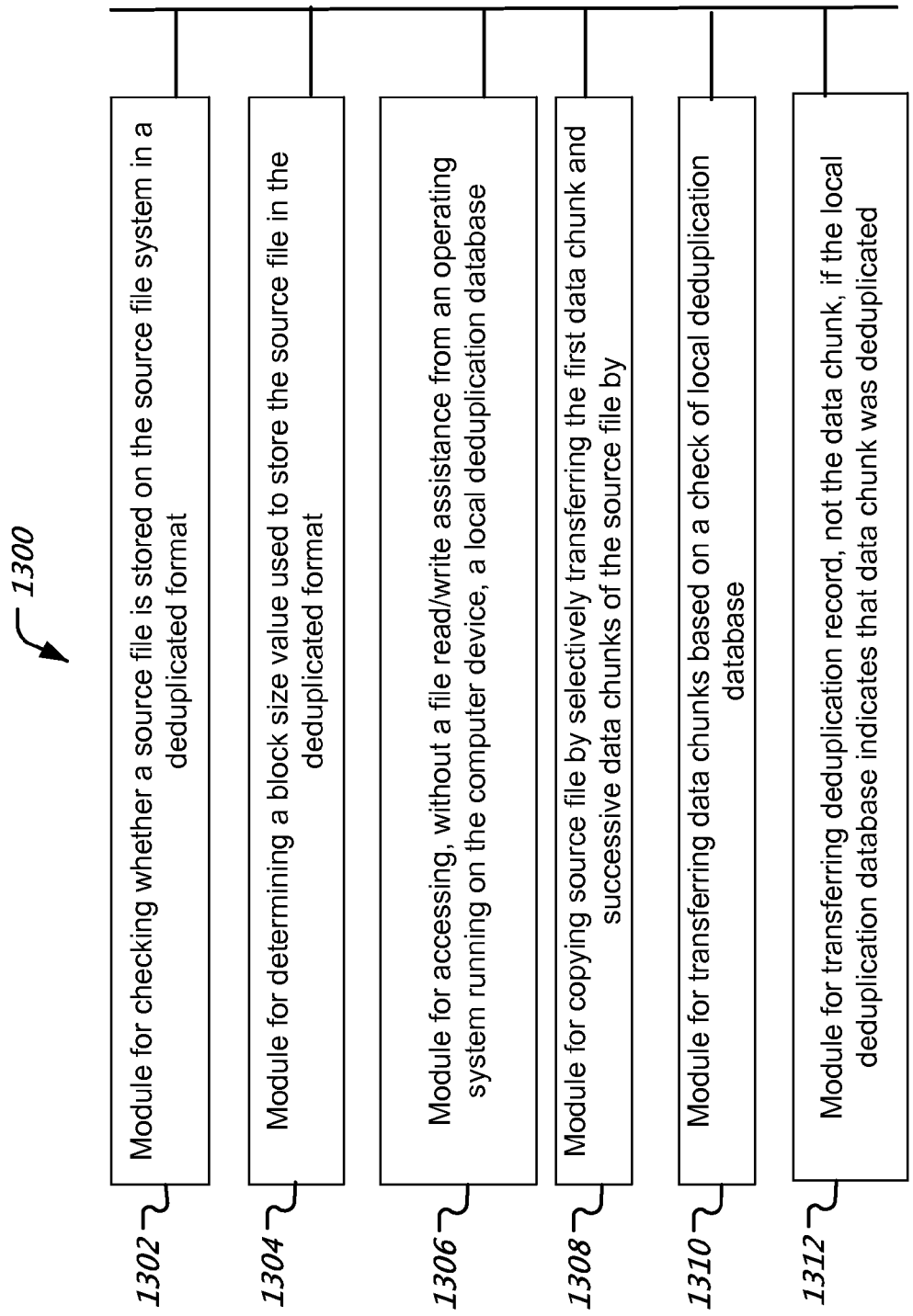
FIG. 13 is a block diagram representation of an apparatus for backing up data from a source file system of a computer device to a backup data storage system.

FIG. 13 is a block diagram representation of an apparatus 1300 for backing up data from a source file system of a computer device to a backup data storage system. A module 1302 is for checking whether a source file is stored on the source file system in a deduplicated format. A module 1304 is for, when the checking indicates that the source file is stored in a deduplicated format, determining a block size value used to store the source file in the deduplicated format. A module 1306 is for accessing, without a file read/write assistance from an operating system running on the computer device, a local deduplication database to determine a location of a first data chunk of the source file stored in the deduplicated format on a local storage device. A module 1308 is for backing up the source file by accessing and selectively transferring the first data chunk and successive data chunks of the source file. A module 1310 is for transferring a given data chunk, if the local deduplication database indicates that the given data chunk was not deduplicated. A module 1312 is for transferring a deduplication record, without transferring the given data chunk, if the local deduplication database indicates that the given data chunk was deduplicated.

Figure 14:
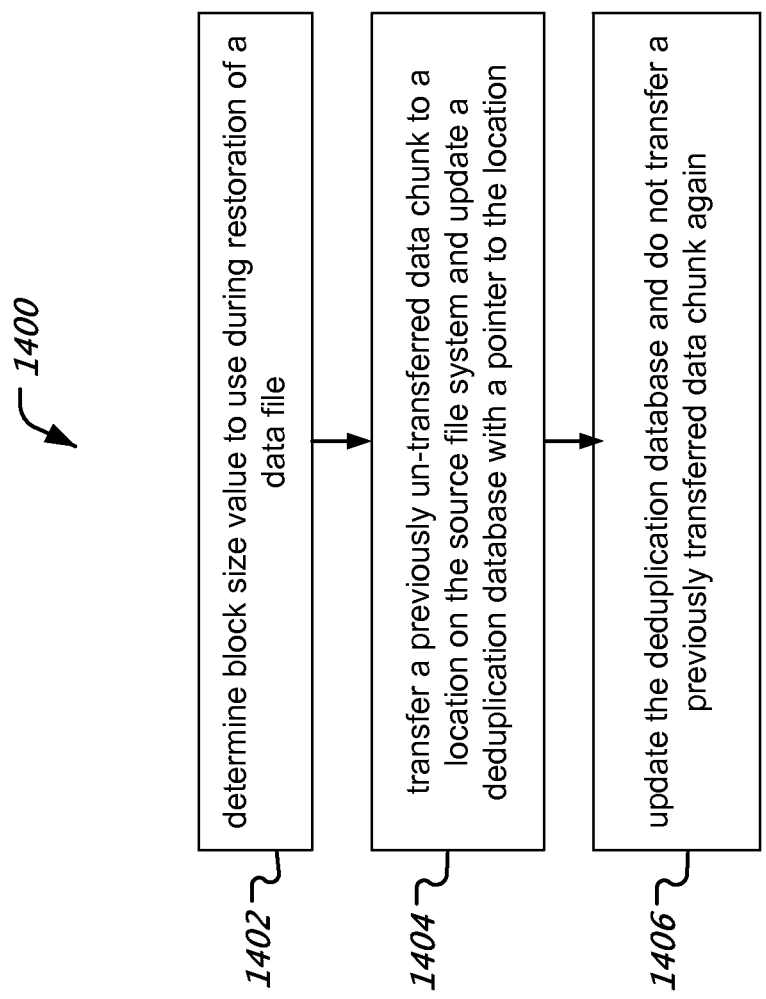
FIG. 14 is a flowchart representation of a process of restoring data to a source file system of a computer device from a backup data storage system.

FIG. 14 is a flowchart representation of a process 1400 of restoring data from a backup data storage system to a source file system that can store files in a deduplicated format.

At 1402, the process determines a block size value used to restore a backed up file in the deduplicated format. In some implementations, the determination step simply involves having a priori knowledge of the block size based on, e.g., the operating system or information stored during a backup or copying operation for the file. In some implementations, the above-described trial and error techniques are used.

At 1404, the process transfers, for each data chunk of the backed up file, if the data chunk was not previously transmitted during the restoration, the data chunk to the source file system and updating a deduplication database at the source file system with a pointer a location where the data chunk is transferred to.

At 1406, the process updates the deduplication database at the source file system, without transferring the data chunk with a deduplication entry when the data chunk was previously transmitted during the restoration. As previously discussed, significant savings in the amount of data transferred during backup and restoration can be obtained when a deduplication record is transmitted instead of the data chunk itself.

In some implementations, the deduplication database may be updated to indicate that the data chunk being transferred is duplicative. In some implementations, the deduplication data base at the source file system may also be updated by saving a pointer value that links a duplicative data chunk to the copy of that data chunk previously transferred to the source file. In some implementations, e.g., when the source file system and the backup storage system use the same hash values, the deduplication record may include the hash value of the data chunk.

Figure 15:
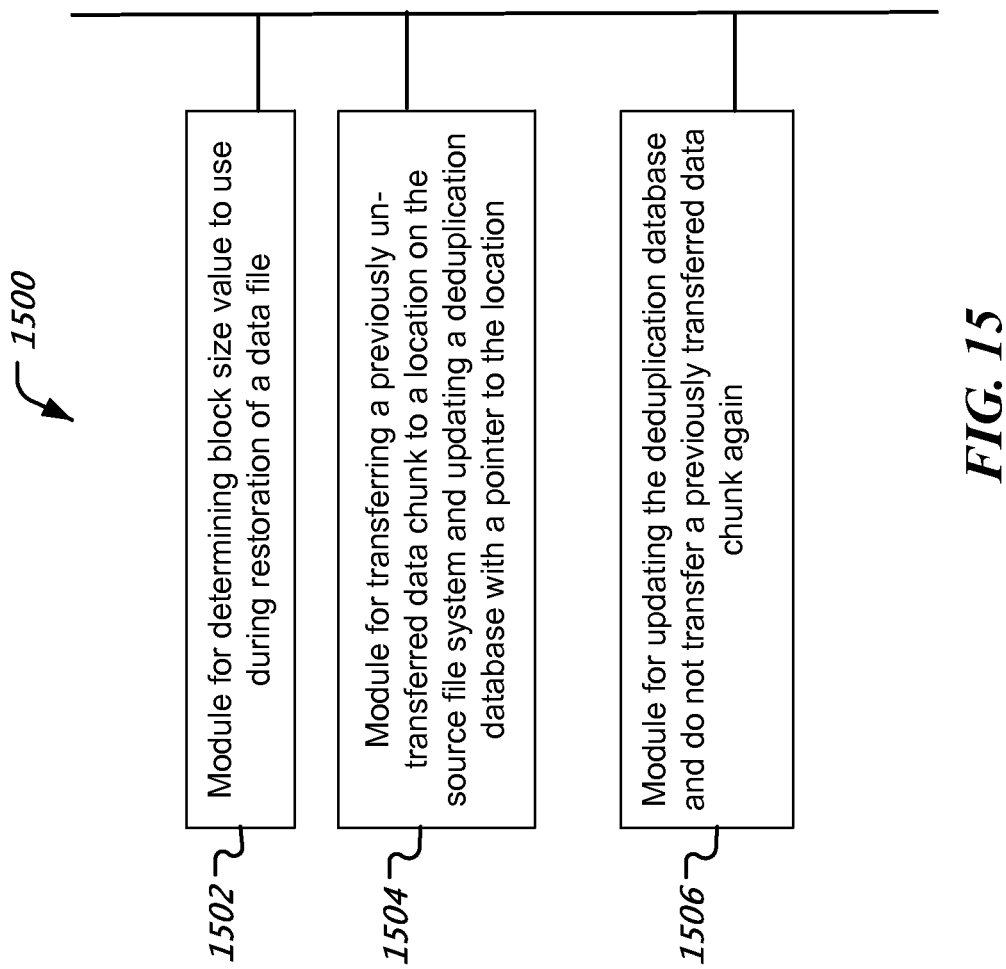
FIG. 15 is a block diagram representation of an apparatus for restoring data to a source file system of a computer device from a backup data storage system.

FIG. 15 is a block diagram representation of an apparatus 1500 for restoring data from a backup data storage system to a source file system that can store files in a deduplicated format. A module 1502 is for determining a block size value used to restore a backed up file in the deduplicated format. A module 1504 is for transferring, for each data chunk of a backed up file, if the data chunk was not previously transmitted during the restoration, the data chunk to the source file system and updating a deduplication database at the source file system with a pointer a location where the data chunk is transferred to. A module 1506 is for updating, for each data chunk of the backed up file, the deduplication database at the source file system without transferring the data chunk with a deduplication entry if the data chunk was previously transmitted during the restoration. The apparatus 1500 and modules 1502, 1504, 1506 may further be configured to implements some of the techniques disclosed in this document.

Figure 16:
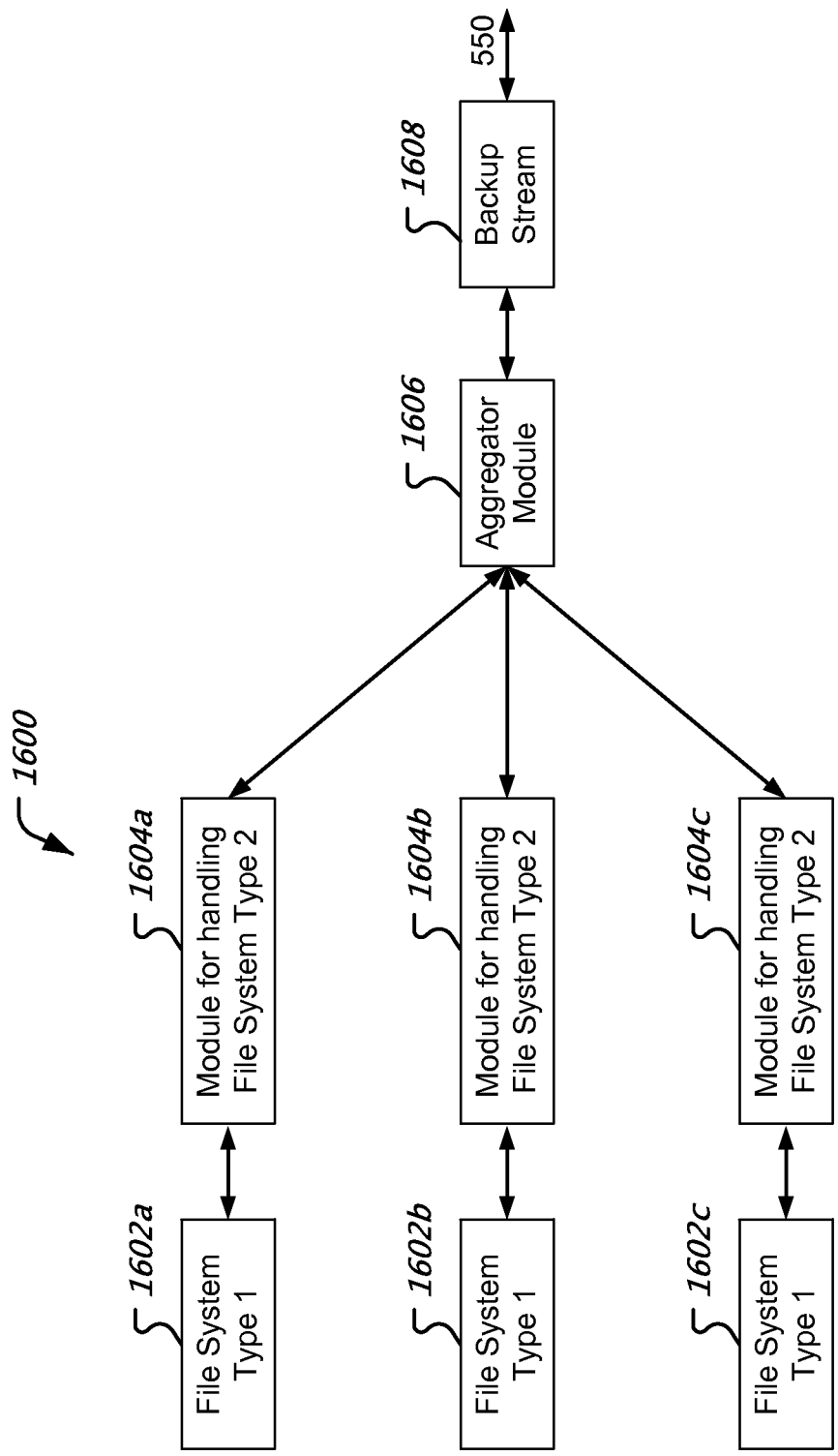
FIG. 16 is a block diagram representation of a technique for handling backups of multiple file system types.

FIG. 16 is a block diagram representation of a configuration 1600 for handling backup/restore operations for client computers having different file system types. Many present day operating systems often support multiple system types. For example, Windows OS supports the use of File Allocation Table (FAT) or Network Terminal File System (NTFS) or exFAT file system, and so on. These different file systems are represented in configuration 1600 by blocks 1602a, 1602b and 160c. The configuration 1600 is depicted to support three file systems only for clarity of illustration and, in general, any number of file system types could be supported. To be able to backup data or restore data using any of the previously described techniques, in configuration 1600, three module handlers 1604a, 1604b and 1604c are shown, each for handling a particular type of file system. In this context, "handling" refers to the ability of the modules 1604a, 1604b and 1604c to be able to send and receive data to/from the corresponding file system as previously described with respect to FIGS. 5 to 15. Each handler module 1604a, 1604b and 1604c communicates with an Aggregator module 1606 that then communicates with a backup stream module 1608 that receives/transmits the previously discussed backup or restoration data stream 550 to an external backup storage system. In some implementations, the modules 1604a, 1604b, 1604c, 1606 and 1608 are implemented as a part of the backup client module 706. The backup client 706 may thus be able to be ubiquitously deployed on a client computer 702 having any operating system and any file system. In some implementations, the backup client module 706 includes additional logic to detect the OS and the file system on the client computer on which the backup client module 706 is executed and activate the appropriate file handler module 1604 accordingly.

Those of ordinary skill in the relevant art will appreciate from the detailed description above that several techniques are now disclosed for improving efficiency of a backup operation of a source file system that is stored in a de-duplicated format, such as with newly available operating systems that automatically deduplicate data.

In one advantageous aspect, the disclosed techniques can be used to reduce the amount of data that is transferred from the source file system to the backup storage system during a backup operation This is performed by re-using information available at the source file system about uniqueness/ duplicativeness of data chunks making up a file to be transferred. In another advantageous aspect, a backup data storage system may also further benefit from re-using hash values calculated by the source file system and using the same has values in performing de-duplication operation at the backup storage system. Hash values need not be computed again by the backup storage system.

Those of ordinary skill in the relevant art will also appreciate that the disclosed techniques can be used to reduce the amount of data transferred from a backup storage system to a source file system during restoration of backup data. In one advantageous aspect, a deduplication database at the source file system may be used so that only unique data chunks, i.e., not previously included in the deduplication database of the source file system, are transferred. For data chunks that are duplicative, a deduplication record may be transferred instead. The deduplication record may indicate a location of a copy of the data chunk (that is not transferred) existing in the deduplication database at the source file system.

Those of ordinary skill in the relevant art will furthermore appreciate that the disclosed techniques would be useful in backing up and restoring a de-duplicated file system by reducing the bandwidth, storage and computational resources used by these operations.

Conclusion

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

I claim:

1. A method of backing up data from a source file system of a computer device to a backup data storage system, the method comprising:
   checking whether a source file is locally stored on the source file system in a local deduplicated format of the source file system by performing application programming interface (API) calls to an deduplication control module of the source file system of the computer device to determine whether the source file is stored in the local deduplicated format, wherein the deduplication control module controls deduplication operations associated with source files locally stored on the source file system;

when the checking indicates that the source file is stored in the local deduplicated format, then
  determining a block size value used to store the source file in the deduplicated format;
  accessing, without a file read/write assistance from an operating system running on the computer device, a local deduplication database to determine a location of a first data chunk of the source file stored in the deduplicated format on a local storage device; and,
  backing up the source file by accessing and selectively transferring the first data chunk and successive data chunks of the source file by:
    transferring a given data chunk, if the local deduplication database indicates that the given data chunk was not deduplicated; and
    transferring a deduplication record, without transferring the given datachunk, if the local deduplication database indicates that the given data chunk was deduplicated; and when the check indicates that the source file is stored without deduplication on the computer device, then backing up the source file by transferring data chunks of the source file to the backup data storage system and performing deduplication on the data chunks of the source file.

2. The method of claim 1, further comprising:
updating a backup transaction log at the backup storage system with a first entry type when the given data chunk is transferred, and with a second entry type when the deduplication record is transferred instead of the given data chunk
wherein multiple files of the source file system are backed up using the method.

3. The method recited in claim 2, wherein, when at least one file in a source directory of the source file system is determined to be stored in the deduplicated format, then it is determined that all remaining files in the source directory are also stored in the deduplicated format.

4. The method recited in claim 2, where, when at least one file in the source directory of the source file system is determined to be stored in the deduplicated format, then it is determined that all remaining files in child directories under the source directory are also stored in the deduplicated format.

5. The method of claim 1 wherein the determining whether the source file is stored on the source file system in the deduplicated format is performed without assistance from the operating system.

6. The method of claim 1 further comprising:
when it is determined that the source file is stored in a deduplicated format, transferring hash values corresponding to the source file in the deduplicated format to the backup storage system.

7. The method of claim 1, wherein different hash functions are used for deduplication at the source file system and the backup data storage system, and wherein the determining the block size value is performed without assistance from the operating system.

8. A method for backing up data from a source file system of a computer device to a backup data storage system, the method comprising:
checking whether a source file is stored on the source file system in a deduplicated format by determining whether the source file includes header information or byte patterns that indicate whether the source file includes file data or pointer information indicative of previous deduplication of the source file on the source file system;

when the checking indicates that the source file is stored in a deduplicated format, then
  determining a block size value used to store the source file in the deduplicated format;
  accessing, without a file read/write assistance from an operating system running on the computer device, a local deduplication database to determine a location of a first data chunk of the source file stored in the deduplicated format on a local storage device; and,
  backing up the source file by accessing and selectively transferring the first data chunk and successive data chunks of the source file by:
    transferring a given data chunk, if the local deduplication database indicates that the given data chunk was not deduplicated; and
    transferring a deduplication record, without transferring the given data chunk, if the local deduplication database indicates that the given data chunk was deduplicated; and when the check indicates that the source file is stored without deduplication on the computer device, then backing up the source file by transferring data chunks of the source file to the backup data storage system and performing deduplication on the data chunks of the source file.

9. The method of claim 8, further comprising:
updating a backup transaction log at the backup storage system with a first entry type when the given data chunk is transferred, and with a second entry type when the deduplication record is transferred instead of the given data chunk.

10. The method of claim 9, wherein, when at least one file in a source directory of the source file system is determined to be stored in the deduplicated format, then it is determined that all remaining files in the source directory are also stored in the deduplicated format.

11. The method of claim 9, wherein, when at least one file in the source directory of the source file system is determined to be stored in the deduplicated format, then it is determined that all remaining files in child directories under the source directory are also stored in the deduplicated format.

12. The method of claim 8 further comprising:
when it is determined that the source file is stored in a deduplicated format, transferring hash values corresponding to the source file in the deduplicated format to the backup storage system.

13. The method of claim 1, wherein checking whether a source file is stored on the source file system in a local deduplicated format by performing application programming interface (API) calls deduplication control module of the source file system to determine whether the source file is stored in the local deduplicated format includes:
comparing actual hard drive usage with the size of the source file to determine whether the hard drive usage matches the size of the source file, or performing a read operation of the source file and comparing a read data chunk of the source file with an expected bit pattern for the read operation.

* * * * *